United States Patent
Kim et al.

(10) Patent No.: US 10,861,143 B2
(45) Date of Patent: Dec. 8, 2020

(54) METHOD AND APPARATUS FOR RECONSTRUCTING HYPERSPECTRAL IMAGE USING ARTIFICIAL INTELLIGENCE

(71) Applicant: Korea Advanced Institute of Science and Technology, Daejeon (KR)

(72) Inventors: Min Hyuk Kim, Daejeon (KR); Inchang Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 228 days.

(21) Appl. No.: 16/127,014

(22) Filed: Sep. 10, 2018

(65) Prior Publication Data
US 2019/0096049 A1   Mar. 28, 2019

(30) Foreign Application Priority Data

Sep. 27, 2017 (KR) ........................ 10-2017-0125312
Mar. 20, 2018 (KR) ........................ 10-2018-0031806
Aug. 13, 2018 (KR) ........................ 10-2018-0094253

(51) Int. Cl.
   *G06T 5/50*    (2006.01)
   *G06N 7/08*    (2006.01)
   *G06N 3/08*    (2006.01)

(52) U.S. Cl.
   CPC ............. *G06T 5/50* (2013.01); *G06N 3/08* (2013.01); *G06N 7/08* (2013.01); *G06T 2207/10036* (2013.01); *G06T 2207/20081* (2013.01)

(58) Field of Classification Search
   None
   See application file for complete search history.

(56) References Cited

U.S. PATENT DOCUMENTS

2017/0205337 A1* 7/2017 Akhtman .............. G01J 3/0229
2018/0165554 A1* 6/2018 Zhang .................. G06K 9/6256
2019/0340497 A1* 11/2019 Baraniuk ............. G06N 3/0454

OTHER PUBLICATIONS

Ayerdi, B., & Graña, M. (2016). Hyperspectral image nonlinear unmixing and reconstruction by ELM regression ensemble. Neurocomputing, 174, 299-309. (Year: 2016).*
Charles, A. S., Olshausen, B. A., & Rozell, C. J. (2011). Learning sparse codes for hyperspectral imagery. IEEE Journal of Selected Topics in Signal Processing, 5(5), 963-978. (Year: 2001).*
Li, Y., Xie, W., & Li, H. (2017). Hyperspectral image reconstruction by deep convolutional neural network for classification. Pattern Recognition, 63, 371-383. (Year: 2017).*
Galliani, S., Lanaras, C., Marmanis, D., Baltsavias, E., & Schindler, K. (2017). Learned spectral super-resolution. arXiv preprint arXiv:1703.09470. (Year: 2017).*
Jeon, D., "Multisampling Compressive Video Spectroscopy," Korea Advanced Institute of Science and Technology, Jun. 2, 2016, pp. 1-46.

(Continued)

*Primary Examiner* — Fayyaz Alam
(74) *Attorney, Agent, or Firm* — Fenwick & West LLP

(57) ABSTRACT

A method and an apparatus for reconstructing a hyperspectral image using artificial intelligence are provided. The method includes receiving an encoded sensor input for an image and reconstructing a hyperspectral image of the image for the encoded sensor input based on a previously generated nonlinear learning model.

14 Claims, 35 Drawing Sheets

(56) References Cited

OTHER PUBLICATIONS

Korean Intellectual Property Office, Office Action, Korean Application No. 10-2018-0094253, dated Sep. 2, 2019, 6 pages (with concise explanation of relevance).
Li, Y. et al., "Hyperspectral image reconstruction by deep convolutional neural network for classification," Pattern Recognition, Mar. 31, 2017, vol. 63, pp. 371-383.
Ma, X. et al., "Spectral—Spatial Classification of Hyperspectral Image Based on Deep Auto-Encoder," IEEE Journal of Selected Topics in Applied Earth Observations and Remote Sensing, Sep. 30, 2016, vol. 9, No. 9, pp. 1-13.

* cited by examiner

FIG. 7E

METHOD AND APPARATUS FOR RECONSTRUCTING HYPERSPECTRAL IMAGE USING ARTIFICIAL INTELLIGENCE

CROSS-REFERENCE TO RELATED APPLICATIONS

This patent application claims priority under 35 U.S.C. § 119 to Republic of Korea Patent Application No. 10-2017-0125312 filed on Sep. 27, 2017, Republic of Korea Patent Application No. 10-2018-0031806 filed on Mar. 20, 2018, and Republic of Korea Patent Application No. 10-2018-0094253 filed on Aug. 13, 2018, in the Korean Intellectual Property Office, each of each is incorporated by reference in its entirety.

BACKGROUND

Embodiments of the inventive concept described herein relate to technologies of restoring hyperspectral images, and more particularly, relate to a method and apparatus for restoring or reconstructing high-quality hyperspectral images using artificial intelligence, for example, a convolutional autoencoder which is a kind of convolutional neural network (CNN) and is a nonlinear learning model.

Different from conventional RGB cameras, hyperspectral images contain information from a much denser spectral sampling, that is, additional data. Herein, the additional data may be used in many applications, including appearance capture, environmental monitoring, scientific imaging, astronomy, and the like.

There are many works that focus on developing hardware architectures to capture hyperspectral information. The most straight forward approach is temporal-spectral scanning, which isolates wavelength measurements using different bandpass or liquid crystal tunable filters (LCTF), while sequentially scanning the visible spectrum. The spectral resolution of this approach is limited by the number of filters used. Temporal multiple-sampling has been introduced using a micro-translation stage, or a digital micro-mirror device (DMD). Alternatively, spatial-spectral scanning approaches capture image columns for each wavelength through a slit. Other recent approaches include kaleidoscope-based multiple sampling, are configurable camera, or designs aimed to reduce hardware costs.

As described above, earlier solutions focus on designing new hardware architectures, including the use of liquid crystal bandpass filters, push broom scanners, micro-translation stages, or digital mirror devices. However, these techniques share several limiting factors, such as the cost of engineering and building the hardware, or the need to capture static scenes only. Moreover, a common characteristic of these solutions is the tradeoff between spatial resolution and spectral accuracy in the captured results.

Several methods have been proposed to overcome this tradeoff.

Conventional optimization techniques aim to overcome the spatial-spectral tradeoff during reconstruction, usually defining a data fidelity term, and a total variation (TV) $l_1$-norm regularization term to emphasize sparsity of gradients. They rely on two main assumptions: First, hyperspectral components present a very high correlation in both the spatial and spectral domains. Second, hyperspectral vectors belong to a low-dimensional subspace. The conventional techniques assume that spectrally homogeneous segments exist in the spectral dimension, while the conventional technique assumes that spectral gradients are approximately piecewise smooth. Similarly, the conventional technique introduces constrained optimization approach that infers spatial correlation. However, these approaches still exhibit artifacts in the reconstructed image structure and details.

Conventional coded aperture snapshot spectral imaging (CASSI) is one of the most popular hyperspectral imaging approaches, allowing to capture dynamic scenes. The defining aspect of these compressive techniques is that the captured coded information needs to be reconstructed to yield the final image. CASSI may be divided into two classes, depending on howspectral signatures are encoded: (1) spatially-encoded CASSI, using single disperser (SD-CASSI); and (2) spatial-spectral CASSI (SS-CASSI), which codes information in both domains, or dual-disperser CASSI (DDCASSI). All these techniques share an intrinsic tradeoff between spatial resolution and spectral accuracy, so there construction step defines the quality of the final image.

Data-driven methods in conventional techniques learn linear representations of natural spectral images as sparse coded dictionaries, for example, public hyperspectral image datasets. The technique of one example proposes a denoising method during reconstruction. The technique of another example introduces a dual-camera system, combining information from panchromatic video at a high frame rate with hyperspectral information at a low frame rate. Panchromatic information may be used to learn an over complete dictionary. The technique of another example introduces a spatial-spectral encoding hyperspectral imager, equipped with a diffraction grating.

SUMMARY

Embodiments of the inventive concept provide method and apparatus for reconstructing a high-quality hyperspectral image using artificial intelligence, for example, a convolutional autoencoder which is a kind of convolutional neural network (CNN) and is a nonlinear learning model.

According to an aspect of an embodiment, a method for reconstructing a hyperspectral image may include receiving coded data for an image and reconstructing a hyperspectral image of the image for the coded data based on a previously generated learning model.

The method may further include generating a nonlinear learning model through learning using a predetermined hyperspectral image dataset. The reconstructing of the hyperspectral image may include reconstructing the hyperspectral image based on the generated nonlinear learning model and a nonlinear optimization technique.

The generating of the nonlinear learning module may include generating the nonlinear learning model by training a convolutional autoencoder through the learning using the hyperspectral image dataset.

The generating of the nonlinear learning module may include training an encoder network in a nonlinear space using the convolutional autoencoder and generating the nonlinear learning model using a decoder network.

The convolutional autoencoder may include an encoder network for transforming the hyperspectral image dataset into nonlinear representations and a decoder network for generating an original dataset from the nonlinear representations.

The nonlinear learning model may be a learning model for outputting nonlinear reconstruction of the hyperspectral image.

The reconstructing of the hyperspectral image may include reconstructing the hyperspectral image of the image for the coded data based on the nonlinear optimization technique which jointly regularizes the fidelity of nonlinear spectral representations for the generated nonlinear learning model and the sparsity of gradients in a spatial domain.

The reconstructing of the hyperspectral image may include reconstructing the hyperspectral image of the image for the coded data by iteratively performing the nonlinear optimization technique using an alternating direction method of multipliers (ADMM).

The receiving may include receiving the coded data for the image using compressive hyperspectral imaging.

According to another aspect of an embodiment, a method for reconstructing a hyperspectral image may include receiving coded data for an image and reconstructing a hyperspectral image of the image for the coded data based on a previously trained spectral prior.

The method may further include training the spectral prior using a predetermined hyperspectral image dataset. The reconstructing of the hyperspectral image may include reconstructing the hyperspectral image based on the trained spectral prior and a nonlinear optimization technique.

The reconstructing of the hyperspectral image may include reconstructing the hyperspectral image of the image for the coded data based on the nonlinear optimization technique which jointly regularizes the fidelity of nonlinear spectral representations for the trained spectral prior and the sparsity of gradients in a spatial domain.

The reconstructing of the hyperspectral image may include reconstructing the hyperspectral image of the image for the coded data by iteratively performing the nonlinear optimization technique using an alternating direction method of multipliers (ADMM).

According to another aspect of an embodiment, an apparatus for reconstructing a hyperspectral image may include a reception unit configured to receive coded data for an image and a reconstruction unit configured to reconstruct a hyperspectral image of the image for the coded data based on a previously generated learning model.

The apparatus may further include a generation unit configured to generate a nonlinear learning model through learning using a predetermined hyperspectral image dataset. The reconstruction unit may be configured to reconstruct the hyperspectral image based on the generated nonlinear learning model and a nonlinear optimization technique.

The generation unit may be configured to generate the nonlinear learning model by training a convolutional autoencoder through the learning using the hyperspectral image dataset.

The generation unit may be configured to train an encoder network in a nonlinear space using the convolutional autoencoder and generate the nonlinear learning model using a decoder network.

The convolutional autoencoder may include an encoder network for transforming the hyperspectral image dataset into nonlinear representations and a decoder network for generating an original dataset from the nonlinear representations.

The nonlinear learning model may be a learning model for outputting nonlinear reconstruction of the hyperspectral image.

The reconstruction unit may be configured to reconstruct the hyperspectral image of the image for the coded data based on the nonlinear optimization technique which jointly regularizes the fidelity of nonlinear spectral representations for the generated nonlinear learning model and the sparsity of gradients in a spatial domain.

The reconstruction unit may be configured to reconstruct the hyperspectral image of the image for the coded data by iteratively performing the nonlinear optimization technique using an alternating direction method of multipliers (ADMM).

The reception unit may be configured to receive the coded data for the image using compressive hyperspectral imaging.

According to another aspect of an embodiment, a method for reconstructing a hyperspectral image may include receiving coded data for an image and reconstructing a hyperspectral image of the image for the coded data based on a previously trained learning model and an optimization technique.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 7A, 7B, 7C, 7D, and 7E are drawings illustrating side-by-side comparisons for the Color Checker hyperspectral image from the Columbia dataset;

DETAILED DESCRIPTION

Figure 1A:
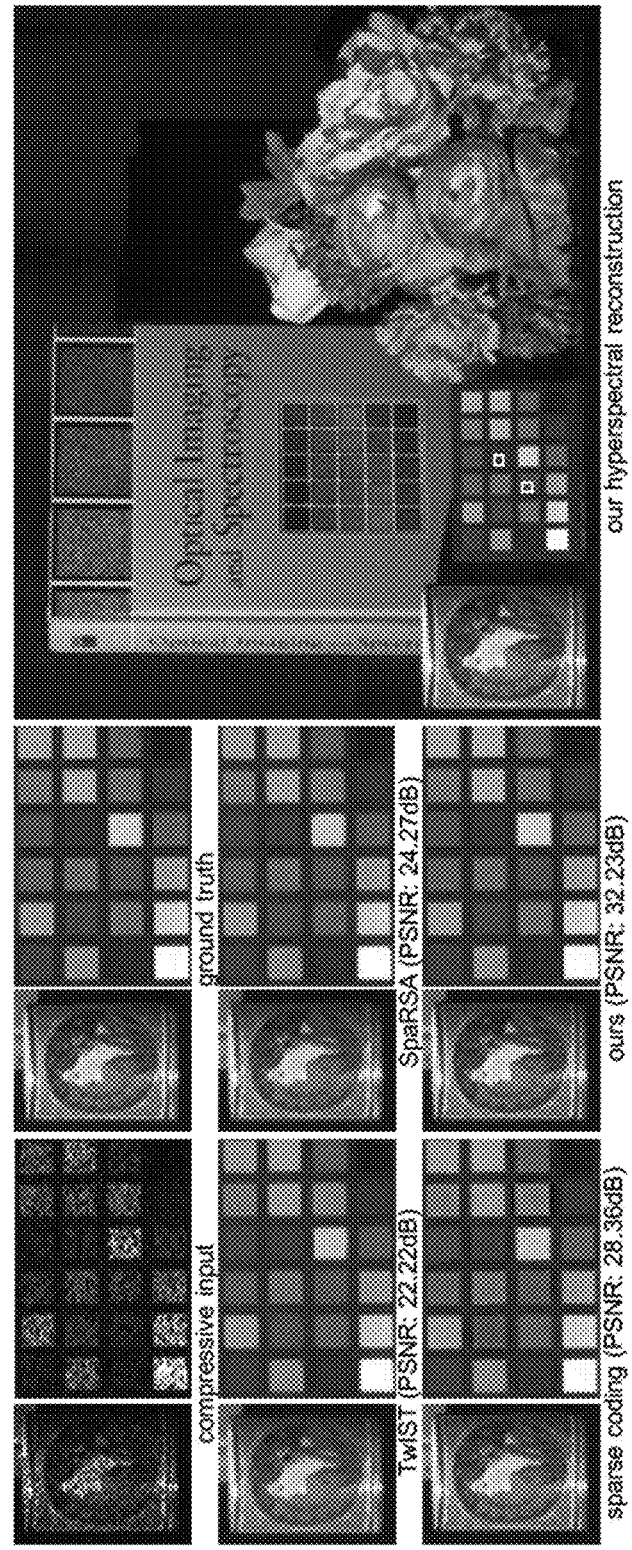
FIGS. 1A and 1B are drawings illustrating an example of comparing a method according to an embodiment of the inventive concept with conventional methods.

Hereinafter, a description will be given in detail of embodiments with reference to the accompanying drawings. However, the inventive concept is restricted or limited to embodiments of the inventive concept. Further, like reference numerals shown in each drawing indicates like members.

An embodiment of the inventive concept may reduce the ill-posedness of the problem and may allow to introduce nonlinear representations of natural hyperspectral images by replacing hand-crafted priors with data-driven priors trained as neural networks.

A novel spectral reconstruction algorithm according to an embodiment of the inventive concept may be applied to a captured input from any compressive imaging technique, for example, single disperser-coded aperture snapshot spectral imaging (SD-CASSI), spatial-spectral CASSI (SS-CASSI), and dual-disperser CASSI (DD-CASSI), providing better results with a significant speed-up factor over other existing data-driven approaches.

An embodiment of the inventive concept may make use of a convolutional autoencoder which produces nonlinear representations. An embodiment of the inventive concept may become more precise and efficient by jointly regularizing the fidelity of nonlinear presentations through a navel global optimization technique.

An embodiment of the inventive concept may present a novel hyperspectral image reconstruction algorithm which overcomes a long-standing tradeoff between spectral accuracy and spatial resolution in existing compressive imaging approaches.

A method according to an embodiment of the inventive concept may include two steps. First, an embodiment of the inventive concept may learn nonlinear spectral representations from real-world hyperspectral datasets. To this end, an embodiment of the inventive concept may build a convolutional autoencoder which allows reconstructing its own input through its encoder and decoder networks. Second, an embodiment of the inventive concept may formulate a novel optimization method which jointly regularizes the fidelity of the learned nonlinear spectral representations and the sparsity of gradients in the spatial domain, by means of a new fidelity prior. A method according to an embodiment of the inventive concept may be applied to any existing compressive imaging architecture, and has been thoroughly tested both in simulation and by building a prototype hyperspectral imaging system to check the results. A technique according to an embodiment of the inventive concept may outperform the state-of-the-art methods from each architecture, both in terms of spectral accuracy and spatial resolution, while its computational complexity is reduced by two orders of magnitude with respect to sparse coding techniques. Moreover, an embodiment of the inventive concept may present hyperspectral interpolation and demosaicing (used to convert samples made by a color filter array of a mosaic pattern of a digital camera into a full color image). Last, an embodiment of the inventive concept may provide a new high-resolution hyperspectral dataset including sharper images of more spectral variety than existing methods, available through a project website.

Furthermore, an embodiment of the inventive concept may provide an in-depth analysis of all factors and parameters of a reconstruction algorithm and may capture a new high-resolution hyperspectral image dataset. Herein, the dataset may fix some limiting aspects of other existing datasets, where images suffer from low spatial resolution and are slightly out of focus, which present a limited spectral range.

An embodiment of the inventive concept may make a new database publicly available at a project website together with its model and code.

Figure 17:
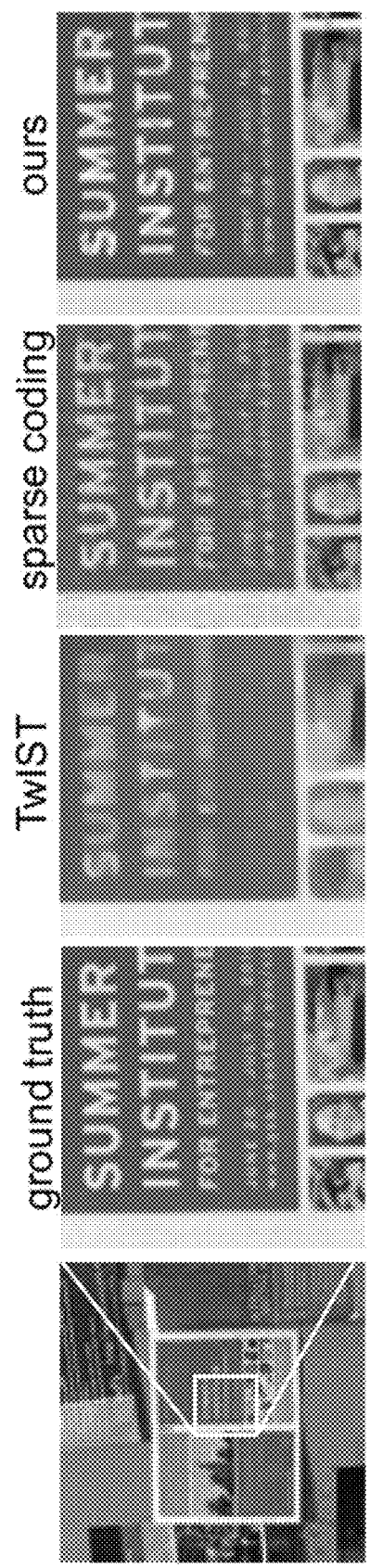
FIG. 17 is a drawing illustrating a limitation example in an embodiment of the inventive concept.

An embodiment of the inventive concept may jointly combine and use artificial intelligence, for example, a convolutional autoencoder which is a kind of convolutional neural network (CNN) and is a nonlinear learning model with nonlinear optimization. A description will be given in detail of such an embodiment of the inventive concept with reference to FIGS. 1 and 17.

Figure 2:
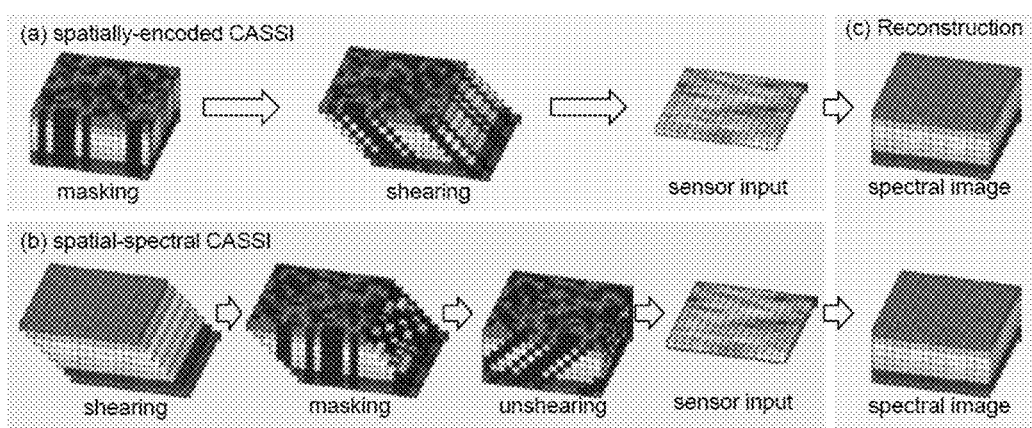
FIG. 2 is a drawing illustrating an example of spatial encoding used in SD-CASSI, SS-CASSI, and DD-CASSI systems.

Spectral signatures imprinted by a coded aperture may be fundamental building blocks in compressive hyperspectral imaging. From these, an image may be reconstructed by means of optimization. There may be two main ways to encode this spectral information: spatial encoding and spatial-spectral encoding. FIG. 2 is drawing illustrating an example of spatial encoding used in SD-CASSI, SS-CASSI, and DD-CASSI systems. As shown in spatial encoding used in the SD-CASSI system shown in (a) of FIG. 2, a coded projection of the spectrum may be created first, then subsequently sheared by dispersion. Therefore, a reconstruction step for SD-CASSI may reconstruct an image from sheared and coded information. As shown in spatial encoding used in the SS-CASSI and DD-CASSI systems shown in (b) of FIG. 2, a corresponding approach may disperse incident rays first, then a mask creates a coded projection, and additional optics may then unshear this information. As a result, spectral reconstruction for SS-CASSI and DD-CASSI may require a simpler optimization than SD-CASSI, resulting in superior results at the cost of a more complex optical setup.

An embodiment of the inventive concept may focus on hyperspectral image reconstruction from compressive input. As such, a method according to an embodiment of the inventive concept may be agnostic to particular encoding of input spectral data. Considering computational advantages, an embodiment of the inventive concept may use spatial-spectral encoding as a first choice to test a reconstruction algorithm. Implementation details are given.

Image Formation

Let h(x, y, z) indicate the spectral intensity of light with wavelength λ at location (x, y). A mask may create coded patterns given by its transmission function T(x, y), while dispersion creates a shear along a horizontal axis, according to a dispersion function φ(λ). In spatial encoding, for example, SD-CASSI, projected light intensity on a sensor i(x, y) may be represented as an integral over all visible wavelengths Λ like Equation 1 below.

$$i(x,y) = \int_\Lambda T(x+\phi(\lambda),y) h(x+\phi(\lambda),y,\lambda) d\lambda \qquad \text{[Equation 1]}$$

In contrast, in spatial-spectral encoding, for example, DD-CASSI, the sheared spectrum h(x+φ(λ),y,λ) may be modulated by the coded mask T(x, y), and the result is unsheared by φ(λ) in an opposite direction. Projected light intensity on the sensor i(x, y) may be represented as an integral over all visible wavelengths Λ like Equation 2 below.

$$i(x,y) = \int_\Lambda T(x-\phi(\lambda),y) h(x,y,\lambda) d\lambda \qquad \text{[Equation 2]}$$

Note that a sign of the horizontal dispersion function $\phi(\lambda)$ may be reversed.

In matrix-vector form, a hyperspectral image with C channels may be expressed as $h \in \Re^n$, where $n = H \times W \times C$, and H and W are the spatial dimensions of the image. Transmissivity may be expressed by means of a sparse modulation matrix $\Phi \in \Re^{m \times n}$, where $m = H \times w$ is the number of pixels in the sensor. This matrix may be made up of $\Phi_c \in \Re^{m \times n}$ submatrices for each wavelength. The product of $\Phi$ and h may yield the captured image $i \in \Re^m$ as shown in Equation 3 below.

$$i = \Phi h \qquad \text{[Equation 3]}$$

This equation describes a highly under-determined system, since $m \ll n$.

An embodiment of the inventive concept may be meaningful in that it uses a nonlinear operator learned through a convolutional autoencoder, instead of a common sparse coding approach of using linear combinations of over complete dictionaries.

General Compressive Sensing vs. Compressive Hyperspectral Imaging

Compressive hyperspectral imaging (HSI) may be considered within a general compressive sensing (CS) approach. However, compressive HSI may have some particular characteristics that require a more specialized solution to obtain high-quality results. CS may reconstruct spatial image structures in two-dimensional (2D) patches. Color information may be reconstructed implicitly by combining reconstructions from the three color channels, computed separately. On the contrary, HSI may reconstruct spectral images as three-dimensional (3D) tensors, with stronger compression along the spectral dimension, resulting in higher complexity. Color may not be reconstructed as in general CS, since it appears overlapped due to dispersion.

In an HSI approach according to an embodiment of the inventive concept, a monochromatic sensor may capture 31 spectral channels. As shown in the top-left of FIG. 1, it is dispersion that combines the spectral and the spatial domains (clearly visible in the captured coded information), leading to the common tradeoff between spatial and spectral resolution in HSI.

Figure 1B:
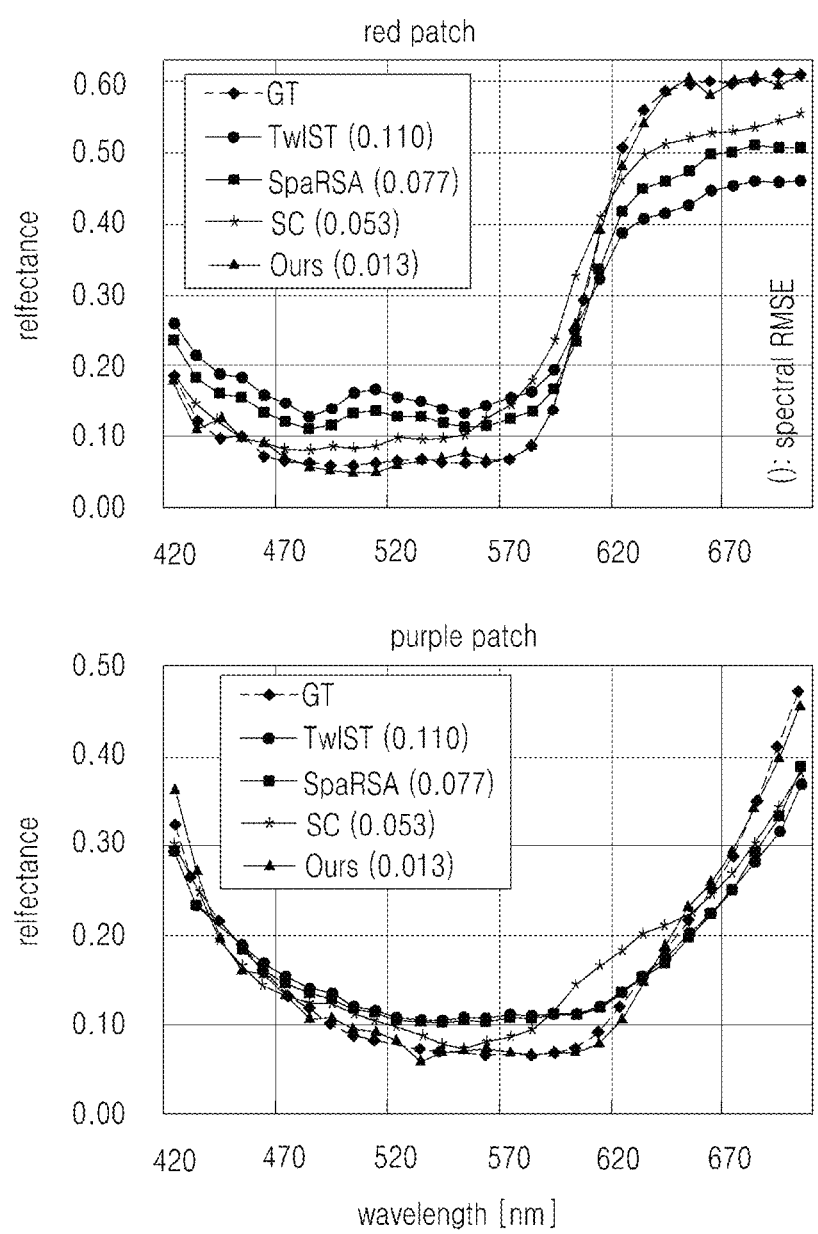

As shown in FIGS. 1A and 1B, a hyperspectral reconstruction algorithm according to an embodiment of the inventive concept may work with an input from any existing compressive imaging architecture and may yield high-quality results. Such a result may be represented both in terms of spectral accuracy and spatial resolution. As the comparisons show, results according to an embodiment of the inventive concept may improve significantly over previous other methods. For instance, both TwIST and SpaRSA may provide suboptimal spatial reconstruction in general, while sparse coding may yield a noisy reconstruction of the color chart. However, the sparse coding may fail to accurately reconstruct the green border in the coffee mug. The charts show how reconstruction according to an embodiment of the inventive concept provides an excellent fit to the ground-truth data. In addition, an embodiment of the inventive concept may provide a new high-resolution hyperspectral image dataset.

Hyperspectral Image Reconstruction

Figure 3:
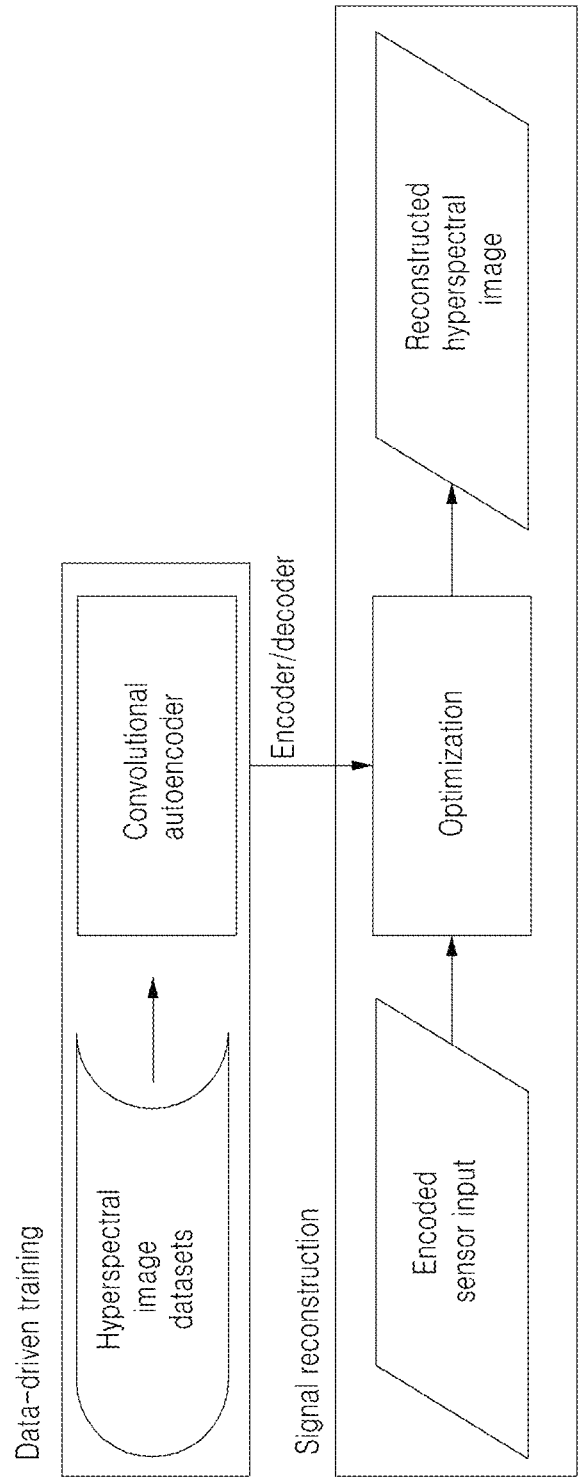
FIG. 3 is a drawing illustrating an overview of a 2-step process to reconstruct hyperspectral images from encoded sensor signals.

FIG. 3 shows an overview of a two-step process to reconstruct hyperspectral images from encoded sensor signals. First, an embodiment of the inventive concept may train convolutional autoencoder to learn nonlinear representations of real hyperspectral image tensors. This nonlinearity is a key aspect of reconstruction according to an embodiment of the inventive concept, since it will allow the embodiment of the inventive concept to cover a wider range of real-world spectral features. Second, an embodiment of the inventive concept may reconstruct hyperspectral images from an encoded input by globally solving a nonlinear optimization problem. As an important aspect in an embodiment of the inventive concept, the embodiment of the inventive concept may introduce a novel prior term that enforces data-driven autoencoder representations of the real-world spectrum into reconstructed signals. Formulation according to an embodiment of the inventive concept may jointly regularize this term and the sparsity of gradients to reconstruct the final hyperspectral image.

Convolutional neural networks may be used for spectral image classification or to extract features from images. However, an embodiment of the inventive concept may fail to be intended to reconstruct original signals from extracted features. Autoencoders, on the other hand, are neural networks where output and input layers share the same number of nodes, and which may reconstruct its own inputs through encoder and decoder functions. The autoencoders may be used for spectral image classification or denoising. Technology of existing one example proposed the convolutional autoencoder, where both convolution operations and activation functions operate on each layer. It has been successfully applied for object retrieval, image classification, denoising, or real-time correction of multipath interference in time-of-flight imaging.

An embodiment of the inventive concept may leverage a convolutional autoencoder to first train an encoder network to learn a representation of hyperspectral images in a nonlinear space, then use the decoder network to reconstruct the final image from coded sensor data.

Similar to previous technologies, an embodiment of the inventive concept assumes that hyperspectral vectors belong to a subspace of hidden representations. However, instead of using predetermined bases (such as discrete cosine transforms or wavelets) or dictionary-based sparse coding, an embodiment of the inventive concept may rely on the convolutional autoencoder to decompose input signals into a set of basis vectors and coefficients. Moreover, while common sparse coding approaches usually reconstruct signals by linear combination of the basis functions, the autoencoder may allow for nonlinear reconstruction of hyperspectral information, which fits better the nonlinear nature of the problem, and thus leads to better results.

Figure 4:
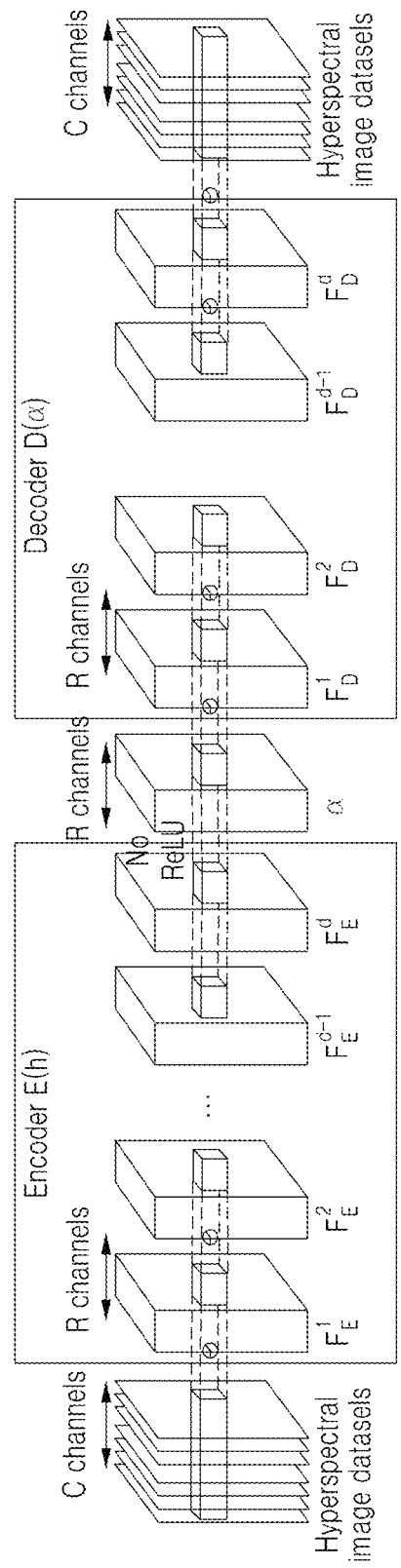
FIG. 4 is a drawing illustrating an example of a convolutional autoencoder.

The convolutional autoencoder according to an embodiment of the inventive concept may include, as shown in FIG. 4, two subnetworks: an encoder network that transforms input training datasets into their nonlinear representations, and a decoder network that generates original datasets from these representations. Formally, the convolutional autoencoder AO is thus a composition of the encoder function E( ) and the decoder function D( ).

After training the network, an embodiment of the inventive concept may convert a hyperspectral image h into a nonlinear representation $\alpha$ by using the encoder function $\alpha = E(h)$. An embodiment of the inventive concept may then reconstruct the hyperspectral image h from $\alpha$ using the decoder function $h \approx D(\alpha)$, which therefore acts as a hyperspectral image prior. This may be described as Equation 4 below.

$$A(h) = D(E(h)) \approx h \qquad \text{[Equation 4]}$$

A signal reconstruction process according to an embodiment of the inventive concept may search for the nonlinear hyperspectral representation that satisfies an image formation model according to the embodiment of the inventive concept.

Network Architecture

As shown in FIG. 4, an autoencoder according to embodiment of the inventive concept may include (2×d+1) layers, excluding the input and the output layers.

Herein, d may refer to the number of hidden layers of each subnetwork.

The encoder network E(h) is placed at the beginning of the autoencoder. Assuming that an input of H×W×C is fed into the encoder network, the encoder may output a nonlinear representation of the hyperspectral image, defined as Equations 5 and 6 below.

$$E(h) = W_E^{d+1} * F_E^d + b_E^{d+1} \quad \text{[Equation 5]}$$

$$F_E^I = \sigma(W_E^I * F_E^{I-1} + b_E^I) \text{ for } I \in \{1 \ldots d\} \quad \text{[Equation 6]}$$

Herein, $W_E^I$, $F_E^I$, and $b_E^I$ may refer to the kernel weight, the intermediate feature representation, and the bias in layer 1 of the encoder network, respectively. The weights and the biases form an autoencoder. The subscript E may refer to the encoder. σ may refer to a nonlinear activation function, so-called a rectified linear unit (ReLU).

An embodiment of the inventive concept may set $F_E^0$ as the input hyper spectral image h. Note that in order not to impose any constraints on α in the later reconstruction step, this activation function may fail to be applied to the output layer in Equation 5 above.

Similar to the architecture of the encoder network, the decoder network with hidden layers may be defined as Equations 7 and 8 below.

$$D(\alpha) = \sigma(W_D^{d+1} * F_D^d + b_D^{d+1}) \quad \text{[Equation 7]}$$

$$F_D^I = \sigma(W_D^I * F_D^{I-1} + b_D^I) \text{ for } I \in \{I \ldots d\} \quad \text{[Equation 8]}$$

Herein, $F_D^0$ may refer to the nonlinear representation α of the hyperspectral image.

Figure 5A:
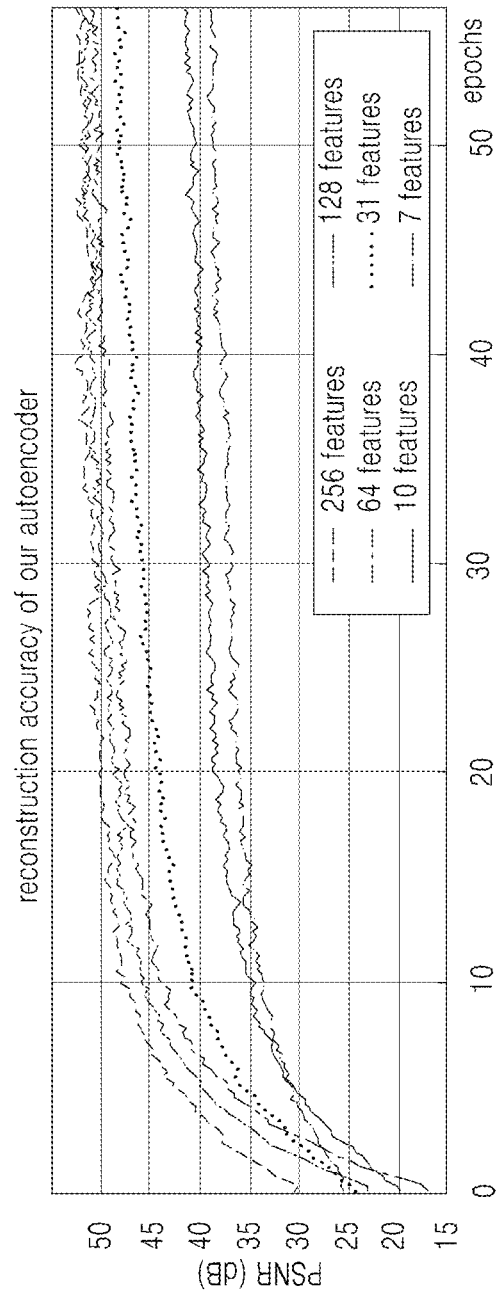
FIGS. 5A, 5B, and 5C are drawings illustrating an example of reconstruction accuracy of an autoencoder.
Figure 5B:
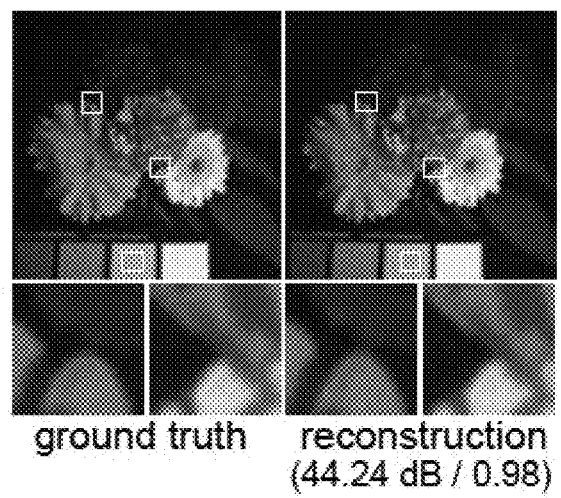
Figure 5C:
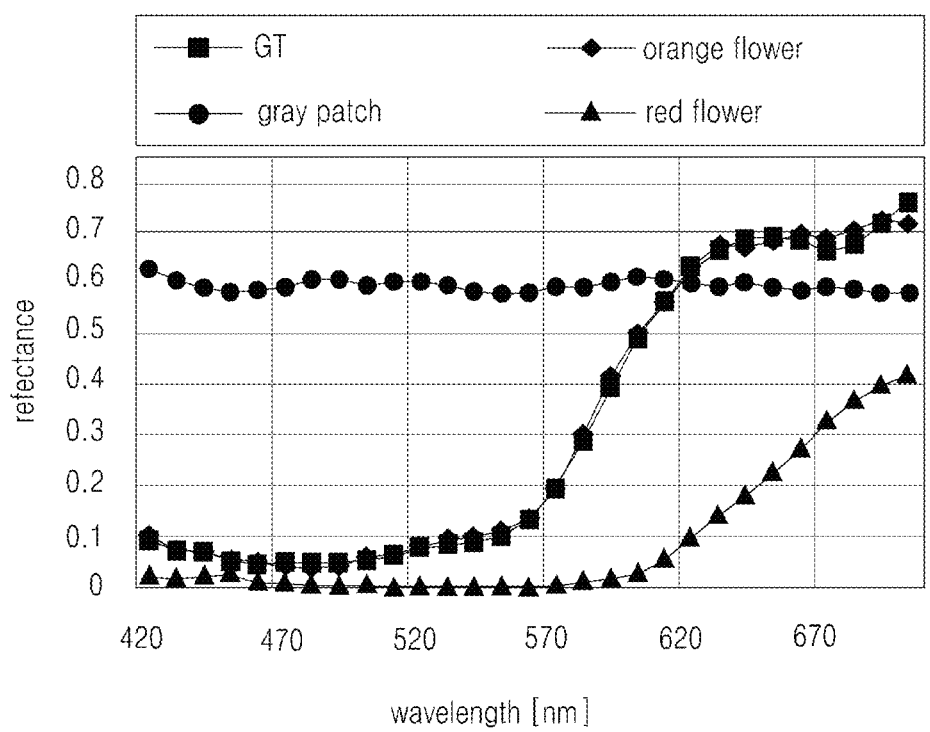

For the first convolutional layer of the encoder network, $F_E^I$, an embodiment of the inventive concept may use 3×3×C, but the other layers may be convolved with kernels of 3×3×R. The spatial resolution of the image and hidden layers remains the same. An embodiment of the inventive concept may be to reconstruct the original signals, rather than to extract feature vectors like existing applications of convolutional autoencoder. In that sense, feature vectors according to an embodiment of the inventive concept may be seen as low-dimensional subspaces defining hyperspectral vectors, analogous to over complete dictionaries in sparse coding. An embodiment of the inventive concept may find that the number of feature vectors R has a significant impact on the accuracy of the reconstructed signal, with more feature vectors yielding better results, as FIG. 5A shows. However, there is a practical tradeoff between performance and memory. In practice, an embodiment of the inventive concept may fix the number of feature vectors in each layer to R=64 (larger than the original C=31). FIGS. 5A and 5B show an example of a hyperspectral reconstruction with R=64 feature vectors and 11 hidden layers. The reconstructed spectral information may be virtually identical to the original.

Training Procedure

A definition of the autoencoder according to an embodiment of the inventive concept may include a set of parameters $\theta = \{(W_E^I, b_E^I), (W_D^I, b_D^I)\}_{I=1}^{d+1}$. To learn nonlinear representations of hyperspectral images, an embodiment of the inventive concept may train the autoencoder network and may find the particular set θ that minimizes a loss function. Given a set of k hyperspectral images $H = \{h^{(i)}\}_{i=1}^k$, a loss function J(H, θ) including a decay term to avoid overfitting may be represented as Equation 9 below.

$$\frac{1}{2k}\sum_{i=1}^{k} \|A(h^{(i)}) - h^{(i)}\|^2 + \frac{\tau_w}{2}\sum_{l=1}^{d+1}\left(\|W_E^l\|^2 + \|W_D^l\|^2\right) \quad \text{[Equation 9]}$$

Herein, $A(h^{(i)})$ may be alternatively expressed as $D(E(h^{(i)}))$, and $\tau_w$ may balance the relative importance between data fidelity and the regularization to avoid overfitting.

An embodiment of the inventive concept may initialize both $W_E^I$ and $W_D^I$ using the normalized initialization in order to maintain variances of back-propagated gradients and activation.

Implementation Details

An embodiment of the inventive concept may create augmented training data sets using 109 hyperspectral images obtained from the publicly available Harvard and Columbia datasets (77 images from the former, and 32 images from the latter). Each hyperspectral image may include approximately 31 wavelength channels.

An embodiment of the inventive concept may additionally augment this initial image dataset following existing network training approaches. In order to achieve scale invariance for input images, an embodiment of the inventive concept may scale the input dataset to two additional resolutions (half and double). This may result in 327 hyperspectral images. An embodiment of the inventive concept may sample 21,760 tensor patches of size 96×96×31 from this augmented dataset.

An embodiment of the inventive concept may employ Tensor Flow to implement the autoencoder, may minimize the loss function in Equation 9 above using the ADAM gradient descent method, and may train it up to 60 epochs. A batch size may be set to 64 with a learning rate of 10-4 for gradient descent, and the weight $\tau_w$ for the decay term may be set to $10^{-8}$. With R=64 feature channels and 11 hidden layers, it took approximately 30 hours to train the network, using a computer equipped with an i7-6770k CPU with 64 GB of memory and an NVIDIA TitanX Pascal GPU with 12 GB of memory.

Reconstruction via Optimization

An embodiment of the inventive concept may represent a hyperspectral image as $h \approx D(\alpha)$, with $\alpha \in \Re^q$, and q=H×W×R. Thus, the compressive image formation defined in Equation 3 above may be re-written as Equation 10 below.

$$i = \Phi h \approx \Phi D(\alpha) \quad \text{[Equation 10]}$$

Note that although Equation 10 above is similar to the linear combination of overcomplete dictionaries in sparse coding, a decoder D( ) in an embodiment of the inventive concept may be a nonlinear operator.

Since m<<n in $\Phi \in \Re^{m \times n}$, Equation 10 above defines an under-determined system. This makes the problem of reconstructing a hyperspectral image from an observation result. An embodiment of the inventive concept may formulate hyperspectral reconstruction by means of an objective function like Equation 11 below.

$$\min_{\alpha} \underbrace{\|i - \Phi D(\alpha)\|_2^2}_{\text{data terms}} + \underbrace{\tau_1 \|\alpha - E(D(\alpha))\|_2^2 + \tau_2 \|\nabla_{xy} D(\alpha)\|_1}_{\text{prior terms}} \quad \text{[Equation 11]}$$

Herein, $E: \mathfrak{R}^n \to \mathfrak{R}^q$ may refer to the encoder, $\nabla_{xy}$ may denote the spatial gradient operator, and $\tau_1$ and $\tau_2$ may adjust and weigh the relative importance between the data fidelity and the prior terms.

Figure 9A:
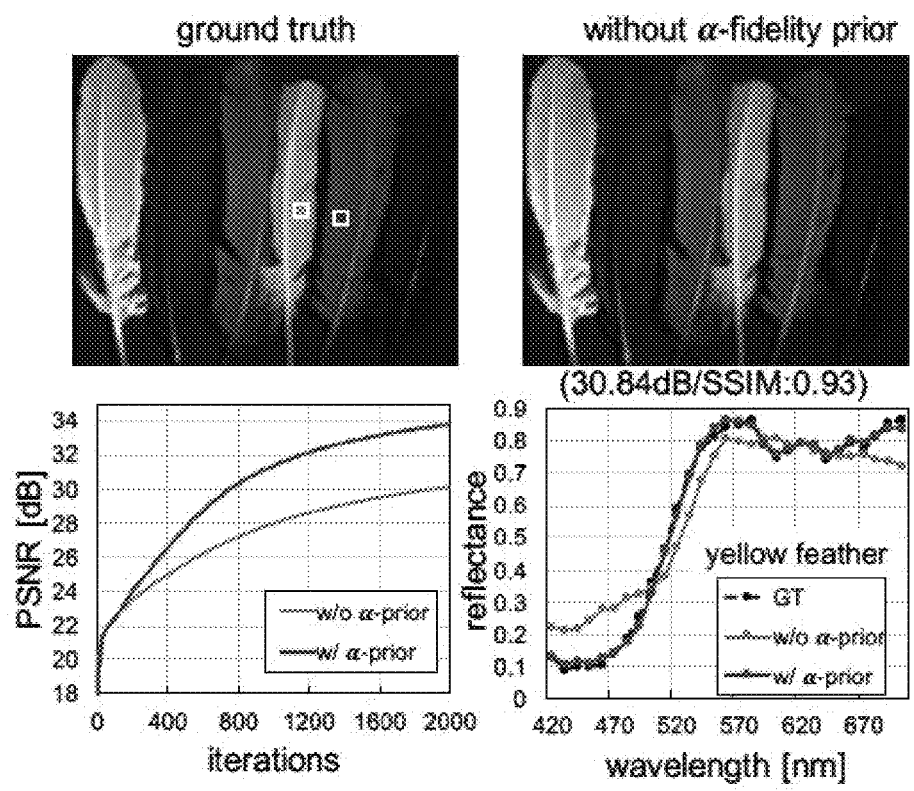
FIGS. 9A and 9B are drawings illustrating an example of the impact of an α-fidelity prior according to an embodiment of the inventive concept.
Figure 9B:
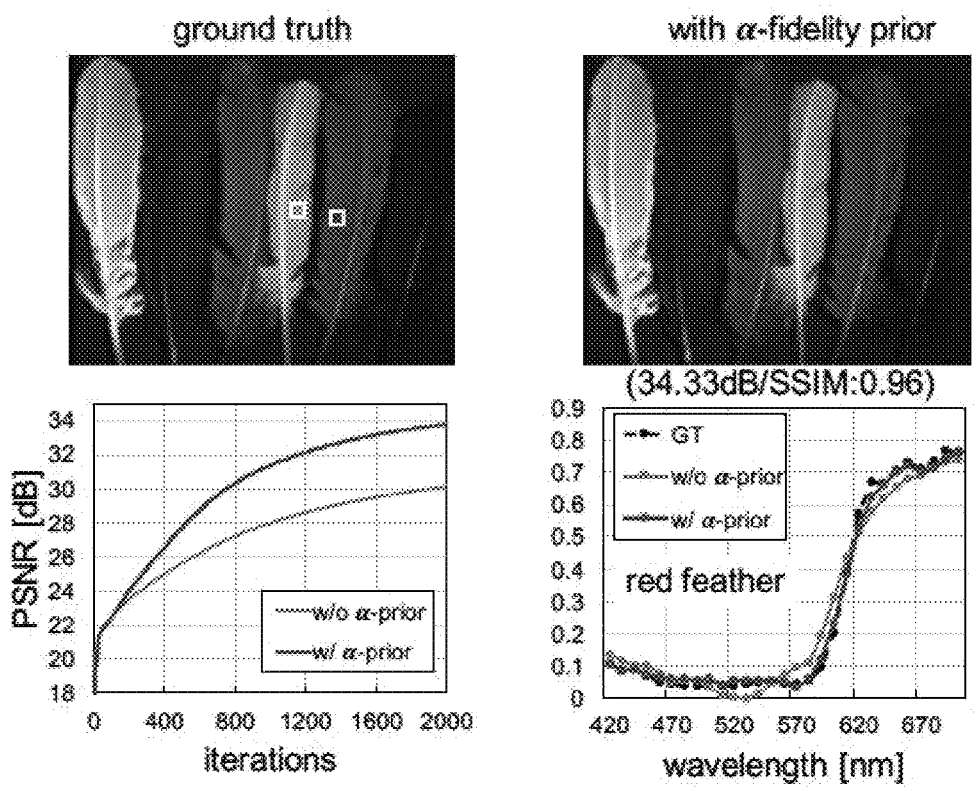

A first prior term may regularize the fidelity of nonlinear representations using the encoder-decoder pair, while a second prior term may be a total variation (TV) L1-norm regularizer, favoring sparsity in the spatial domain. The first prior term of α-fidelity may be the key contribution in an objective function according to an embodiment of the inventive concept, since it allows the embodiment of the inventive concept to relate autoencoder representations with an optimization problem according to the embodiment of the inventive concept. This has a large impact on the spectral accuracy of the reconstructed images, as FIG. 9 shows. FIG. 9 is a drawing illustrating an example of the impact of an α-fidelity prior according to an embodiment of the inventive concept. FIG. 9A shows the reconstruction result without the a prior, while FIG. 9B shows the result with the prior. Insets may indicate PSNR and SSIM compared to ground truth. The prior may increase both PSNR and SSIM significantly. Moreover, an embodiment of the inventive concept may show how the prior increases accuracy over the number of iterations. An embodiment of the inventive concept may plot c spectral accuracy for the yellow and red feathers.

Optimization

Since the gradient sparsity term of TV is not differentiable, an embodiment of the inventive concept may first split an objective function n Equation 11 above into two problems in Equations 12 and 13 below.

$$f(\alpha) = \|i - \Phi D(\alpha)\|_2^2 + \tau_1 \|\alpha - E(D(\alpha))\|_2^2 \quad \text{[Equation 12]}$$

$$g(z) = \tau_2 \|Z\|_1 \quad \text{[Equation 13]}$$

Thus, an optimization problem according to an embodiment of the inventive concept may be represented as Equation 14 below.

$$\min_\alpha f(\alpha) + g(z) \text{ subject to } \nabla_{xy} D(\alpha) - z = 0 \quad \text{[Equation 14]}$$

Herein, z may represent the spatial gradients of the reconstructed hyperspectral images.

An embodiment of the inventive concept may iteratively solve the problem of Equation 14 above using the alternating direction method of multipliers (ADMM), as shown in Algorithm 1.

---

ALGORITHM 1: ADMM solution of Equation 14

1: initialization
2: repeat
3: $\alpha^{(k+1)} = \mathrm{argmin}_\alpha \left( f(\alpha) + \frac{\rho}{2} \|\nabla_{xy} D(\alpha) - z^{(k)} + u^{(k)}\|_2^2 \right)$
4: $z^{(k+1)} = \mathrm{argmin}_z \left( g(z) + \frac{\rho}{2} \|\nabla_{xy} D(\alpha^{(k+1)}) - z^{(k)} + u^{(k)}\|_2^2 \right)$
5: $\quad = S_{\tau_2/\rho}(\nabla_{xy} D(\alpha^{(k+1)}) + u^{(k)})$
6: $u^{(k+1)} = u^{(k)} + \nabla_{xy} D(\alpha^{(k+1)}) - z^{(k+1)}$
7: until the stopping criterion is satisfied.

---

First, the $l_2$ terms may be updated in Line 3 and may be minimized by the ADAM optimization algorithm. An embodiment of the inventive concept may then minimize the $l_1$ term with an auxiliary variable z in Line 4, using proximal gradient descent. An embodiment of the inventive concept may update this term using an element-wise soft-thresholding function $S_{\tau_2/\rho}$, shown in Line 5. In Algorithm 1, the strength of the sparsity of gradients $\nabla_{xy} D(\alpha)$ constraint may be controlled like Equation 15 below.

$$S_{\tau_2/\rho}(v_i) = \begin{cases} v_i - \tau_2/\rho, & \text{if } v_i > \tau_2/\rho, \\ 0, & \text{if } |v_i| \leq \tau_2/\rho, \\ v_i + \tau_2/\rho, & \text{if } v_i < \tau_2/\rho, \end{cases} \quad \text{[Equation 15]}$$

The Lagrange multipliers u may then be updated in Line 6, via gradient ascent, to satisfy the constraint in Equation 14 above. This process may be repeated until an embodiment of the inventive concept reaches the stopping criterium. Once an embodiment of the inventive concept has obtained the solution representations $\alpha_{opt}$, it may reconstruct the final hyperspectral image using the decoder as $D(\alpha_{opt})$.

Parameters

In Equation 11 above, an embodiment of the inventive concept may set $\tau_1$ for the nonlinear representational fidelity to 0.1, while $\tau_2$ and $\rho$ in Algorithm 1 may be set to $10^{-3}$ and $10^{-1}$, respectively. An optimizer according to an embodiment of the inventive concept may perform approximately 20 ADMM iterations. The ADAM optimization program for $f(\alpha)$ in Equation 14 above may iterate 200 steps with a learning rate of $5 \times 10^{-2}$.

Time Complexity

The time complexity of hyperspectral image reconstruction may be proportional to the number of multiplications performed in a convolutional autoencoder. When performing one-stride convolutions, the number of multiplications for a convolutional layer may be $(H \times W) \times (w \times w \times R_i) \times R_o$, where w is the kernel size, and $R_i$ and $R_o$ are the number of feature maps for the input and output of the convolution. In a convolutional autoencoder (64 features with eleven hidden layers) with 3×3 kernels, the total number of multiplications may be approximately $4.4 \times H \times W \times 10^5$. Compared to the existing data-driven approach, the sparse coding method may be considered as a shallow convolutional neural network without hidden layers or activation functions. Using a dictionary with 6200 atoms of 10×10×31 hyperspectral image patches, the estimated number of multiplications may be $(H \times W) \times (10 \times 10 \times 31) \times 6200 \approx 1.9 \times H \times W \times 10^7$, which is two orders of magnitude more.

Activation in the Encoder

As described with reference to FIG. 4, a ReLU activation function may be absent in the output layer of the encoder. This may indicate that nonlinear representation α of hyperspectral images is not constrained to be sparse. Although an embodiment of the inventive concept does not explicitly impose sparsity, the autoencoder may make the representation sparse while a passes through other layers with a ReLU activation function. Another advantage of this absence may be that it simplifies nonlinear optimization. Adding a ReLU activation function in the output layer of the encoder may require an extra non-negative constraint satisfaction term in Equation 11 above. Moreover, two variables, an auxiliary variable and a Lagrange variable, should be introduced in an ADMM formulation in Equation 14 above. As a result, convergence may be slower.

Global vs. Local Optimization

Global optimization approaches, such as TwIST and SpaRSA, may be more effective in reconstructing spectral information, while local optimization techniques such as sparse coding may operate on each patch independently, preserving image structures well. However, the amount of dispersion may be limited by the patch size, which strongly affects computational costs. An approach according to an embodiment of the inventive concept may combine the benefits of both local and global optimization via the convolutional autoencoder and the total variation terms.

Figure 12:
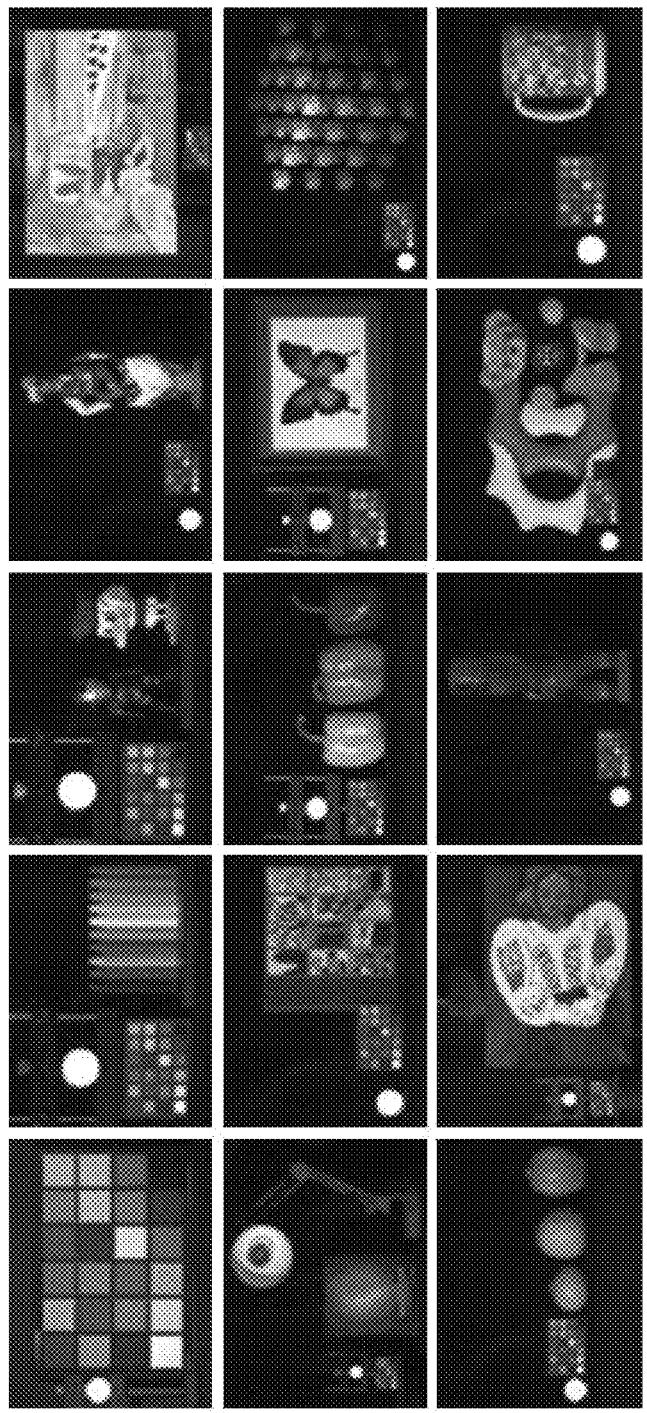
FIG. 12 is a drawing illustrating an example of a hyperspectral image dataset generated by an embodiment of the inventive concept.

To evaluate the performance of the reconstruction algorithm according to an embodiment of the inventive concept, the embodiment of the inventive concept may first create a coded test set from the existing Harvard and Columbia spectral image datasets. In addition, an embodiment of the inventive concept may create, as shown in FIG. 12, a new dataset by simulating the imaging process with the three main types of encoding architectures: SD-CASSI, DD-CASSI and SS-CASSI. Note that the matrix $\Phi$ in Equation 11 above changes depending on the image formation model.

An embodiment of the inventive concept may compare results by this technique against three other methods, representing the three different encoding architectures: TwIST, SpaRSA, and sparse coding. An embodiment of the inventive concept may choose the best architecture for each method to produce these results: DD-CASSI for TwIST and SpaRSA, and SS-CASSI for sparse coding and the technique according to the embodiment of the inventive concept.

Figure 6:
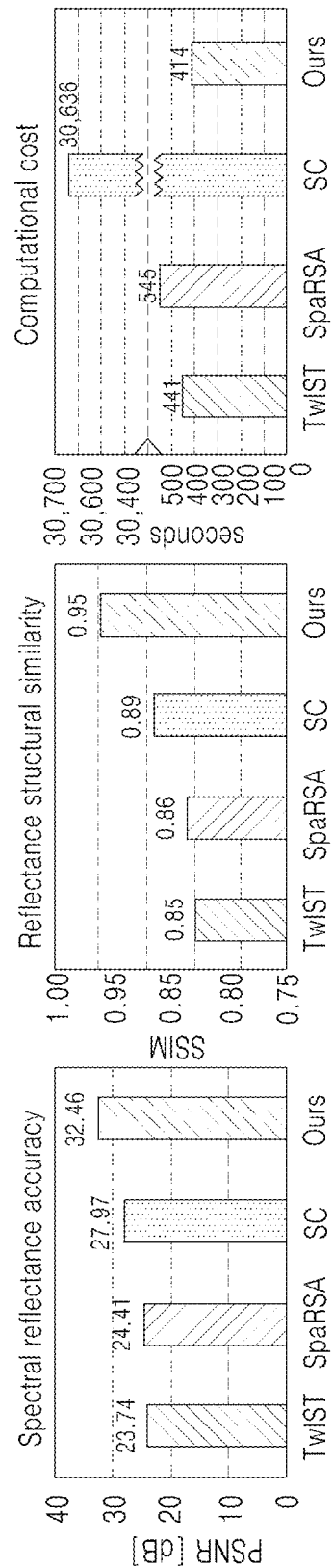
FIG. 6 is a drawing illustrating an example of average results over the Columbia image dataset.

Reconstruction techniques according to an embodiment of the inventive concept may show a significant improvement in both spectral and spatial accuracy. Moreover, the method according to an embodiment of the inventive concept may be the fastest of the three. FIG. 6 is a drawing illustrating an example of average results over the Columbia image dataset. Additionally, an embodiment of the inventive concept may provide an analysis of the parameter space, may compare the method according to the embodiment of the inventive concept against ground truth and a learning-based reconstruction, may introduce the new hyperspectral dataset, and may present results with a real hyperspectral imaging system. Last, an embodiment of the inventive concept may propose two method, without any hardware modifications: from multi-hyperspectral interpolation and hyperspectral demosaicing.

Spectral Accuracy vs. Spatial Resolution

Existing reconstruction techniques may share an intrinsic tradeoff between spectral accuracy and spatial resolution, which defines the quality of the final image. As shown in FIG. 1, traditional optimization approaches such as TwIST and SpaRSA may yield good results in spectral accuracy, but at the cost of suboptimal spatial resolution. On the other hand, the data-driven approach based on sparse coding may offer good spatial resolution, but sacrificing spectral accuracy. In contrast, the method according to an embodiment of the inventive concept may yield high-quality results in both domains. Herein, an embodiment of the inventive concept may compare the performance of the reconstruction algorithm according to the embodiment of the inventive concept in terms of spectral accuracy and spatial resolution, respectively.

Spectral Accuracy

Figure 7A:
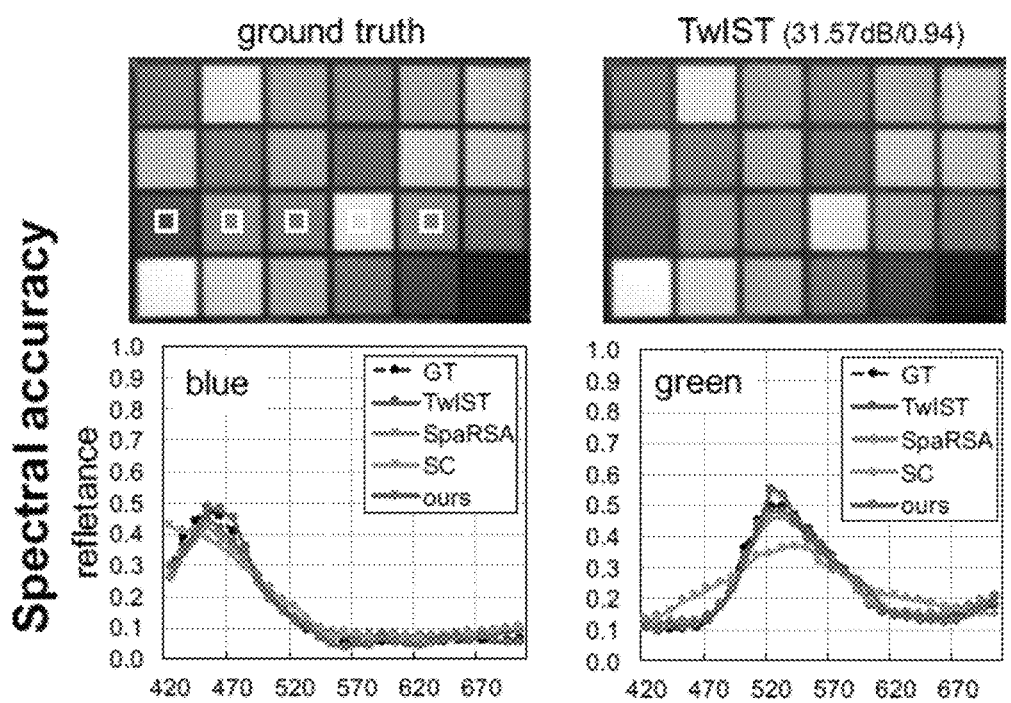
Figure 7B:
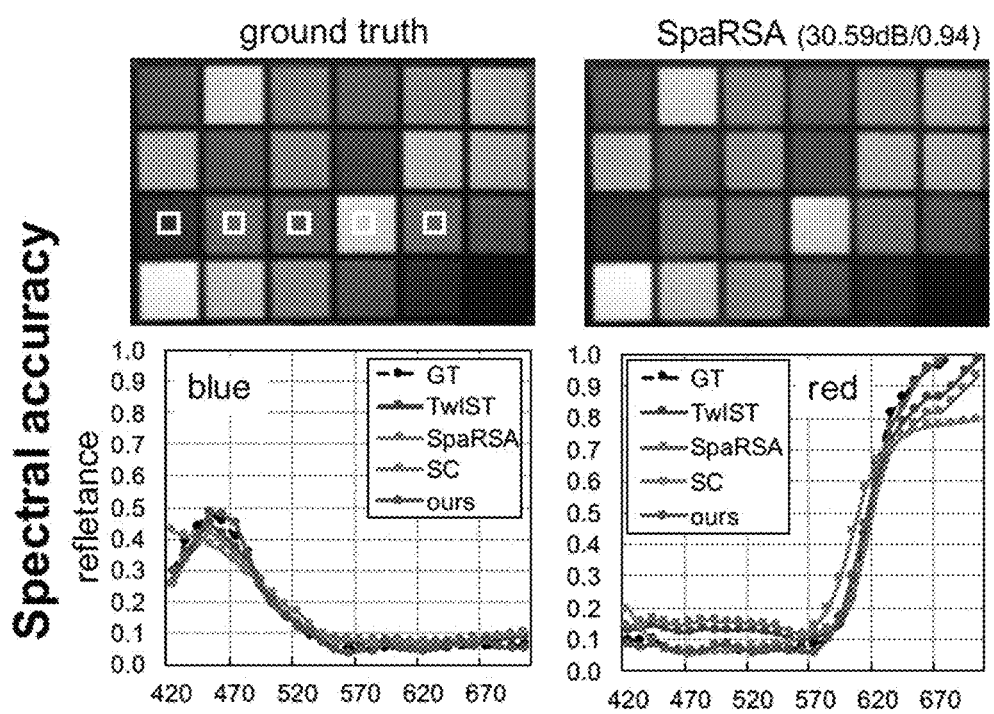
Figure 7C:
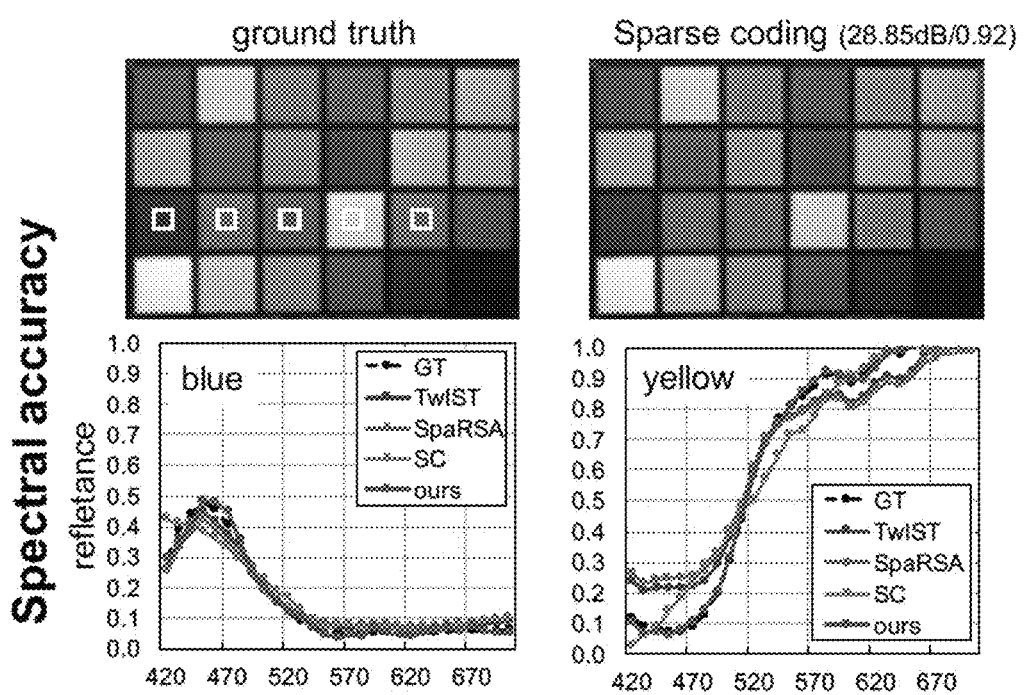
Figure 7D:
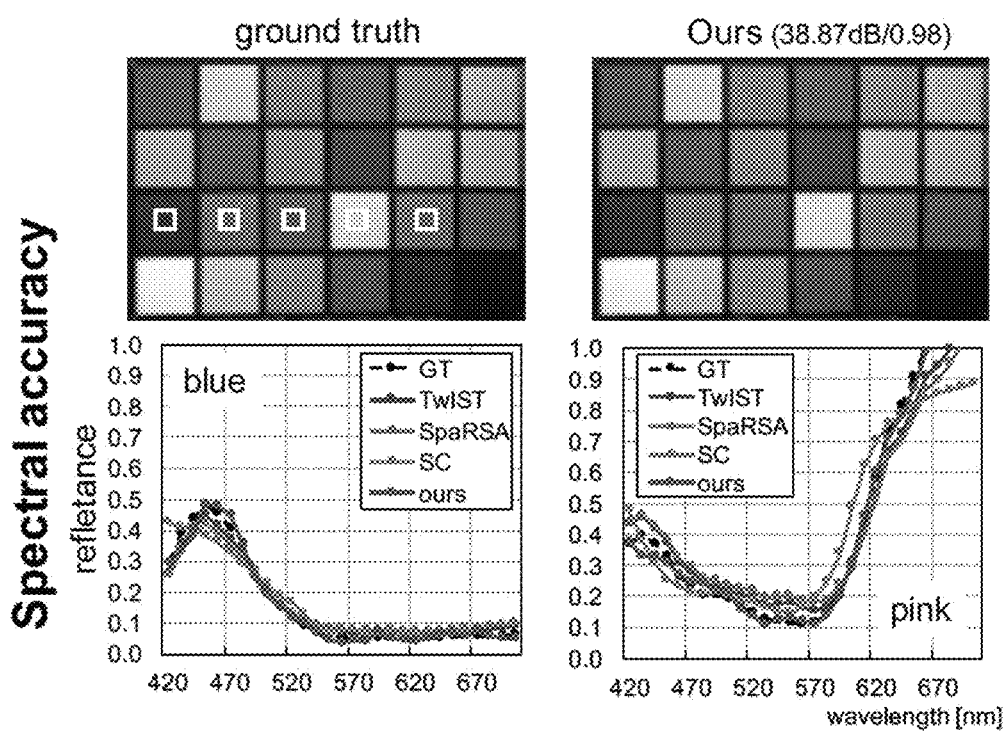
Figure 7E:
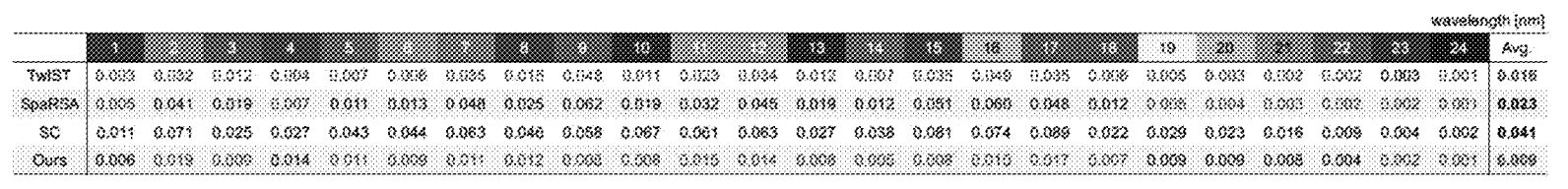

An embodiment of the inventive concept may evaluate the spectral accuracy of reconstructed spectral images by calculating peak signal-to-noise ratios (PSNR) and structural similarity (SSIM). FIGS. 7A-7D show side-by-side comparisons for the ColorChecker hyperspectral image from the Columbia dataset. An embodiment of the inventive concept may convert the results of spectral images to sRGB via the revised 2-degree CIE color matching functions for visualization. The averaged PSNR and SSIM of result (38.87 dB/0.98) according to an embodiment of the inventive concept across the 31 wavelength channels may outperform all the reconstructions of TwIST (31.57 dB/0.94), SpaRSA (30.59 dB/0.94) and sparse coding (28.85 db/0.92). In addition, an embodiment of the inventive concept may evaluate the reconstructed spectral reflectances of five primary colors (blue, green, red, yellow, and pink) in the chart, and the results according to an embodiment of the inventive concept may be consistently closer to the ground truth than the rest of the methods. The table of FIG. 7E shows root-mean-squared errors (RMSEs) for each color patch, as well as the average.

Spatial Resolution

Figure 8A:
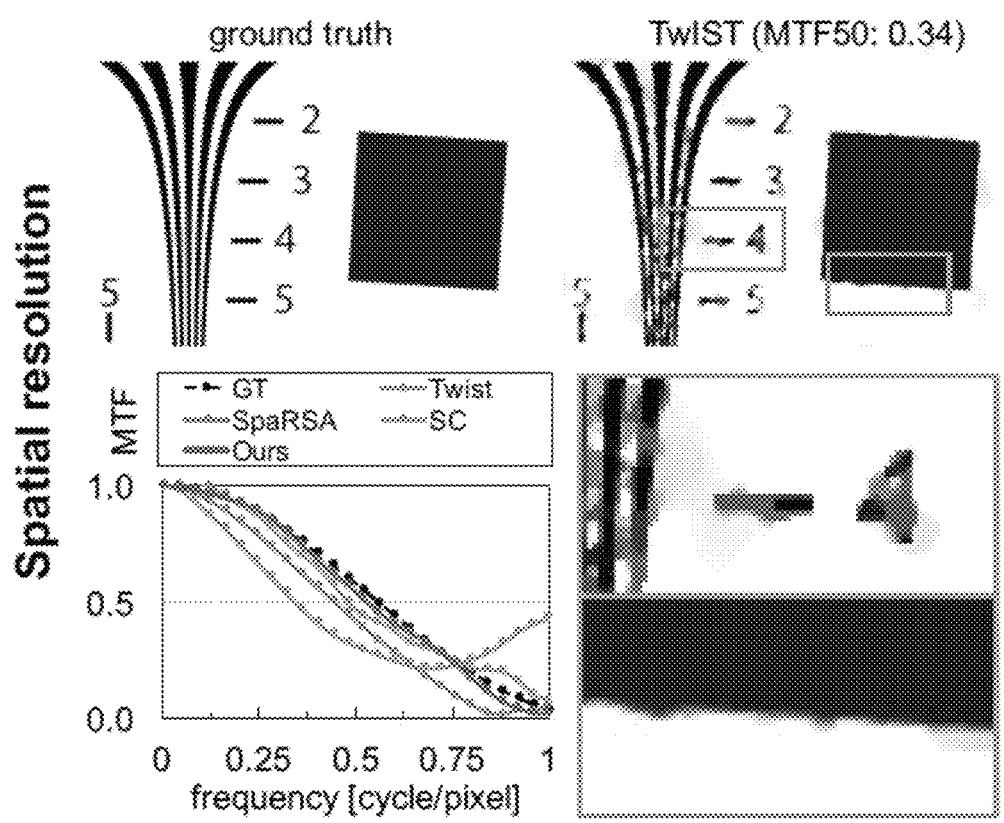
FIGS. 8A, 8B, 8C, and 8D are drawings illustrating the result of reconstructing a standard spatial frequency measurement chart (ISO 12233) using TwIST, SpaRSA, sparse coding, and a method according to an embodiment of the inventive concept.
Figure 8B:
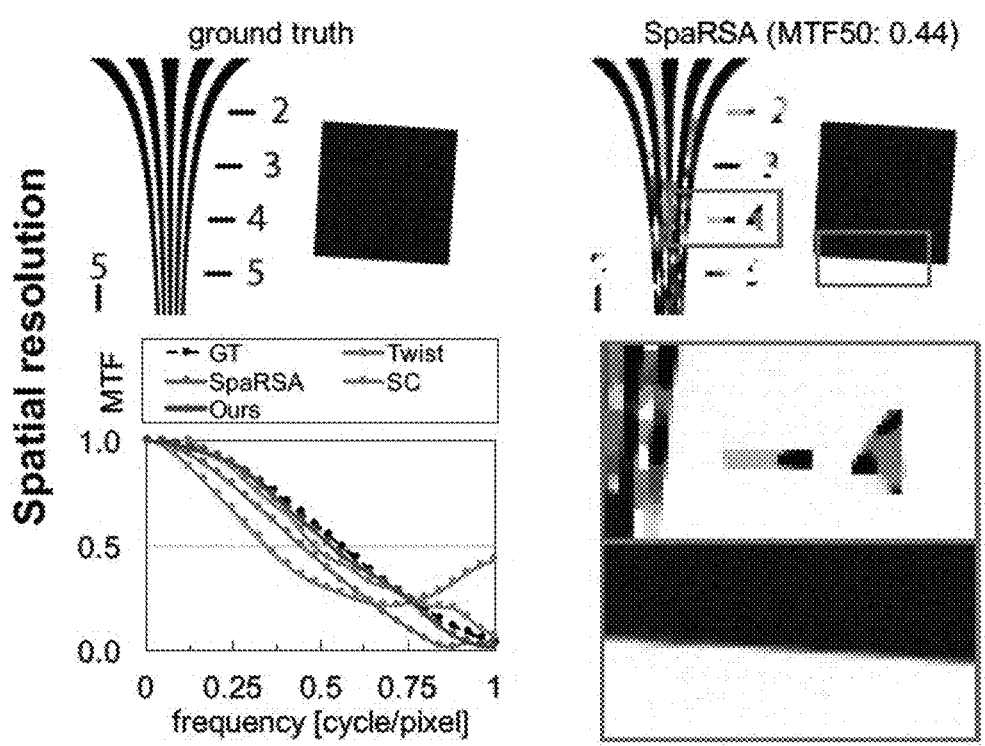
Figure 8C:
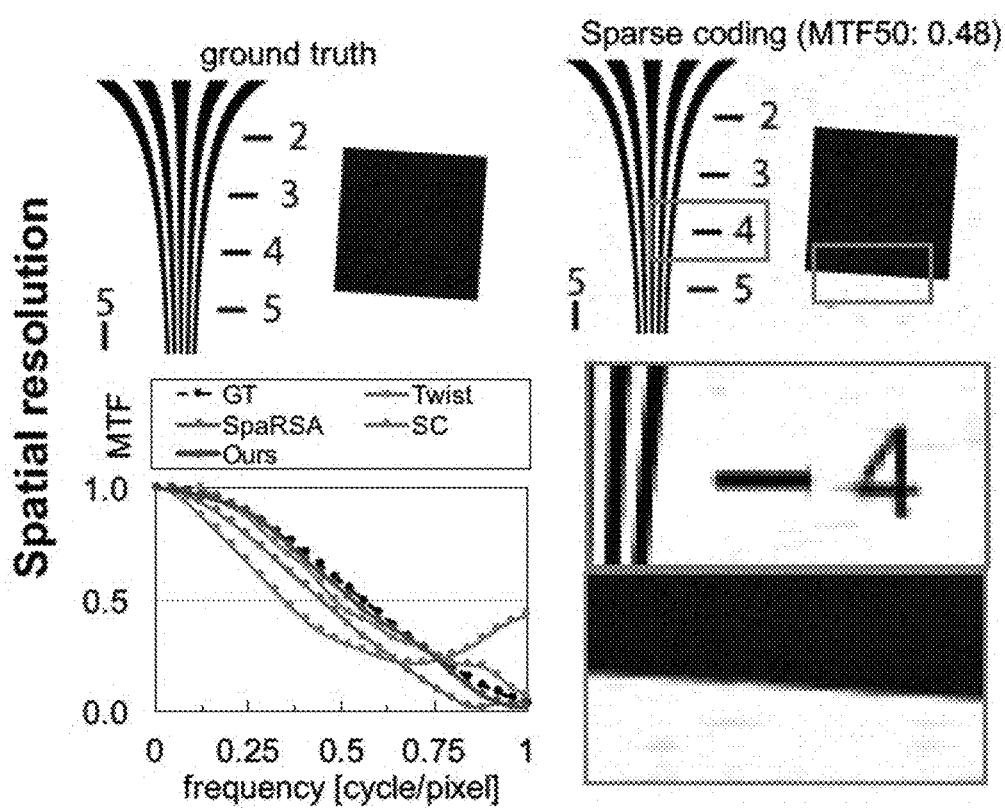
Figure 8D:
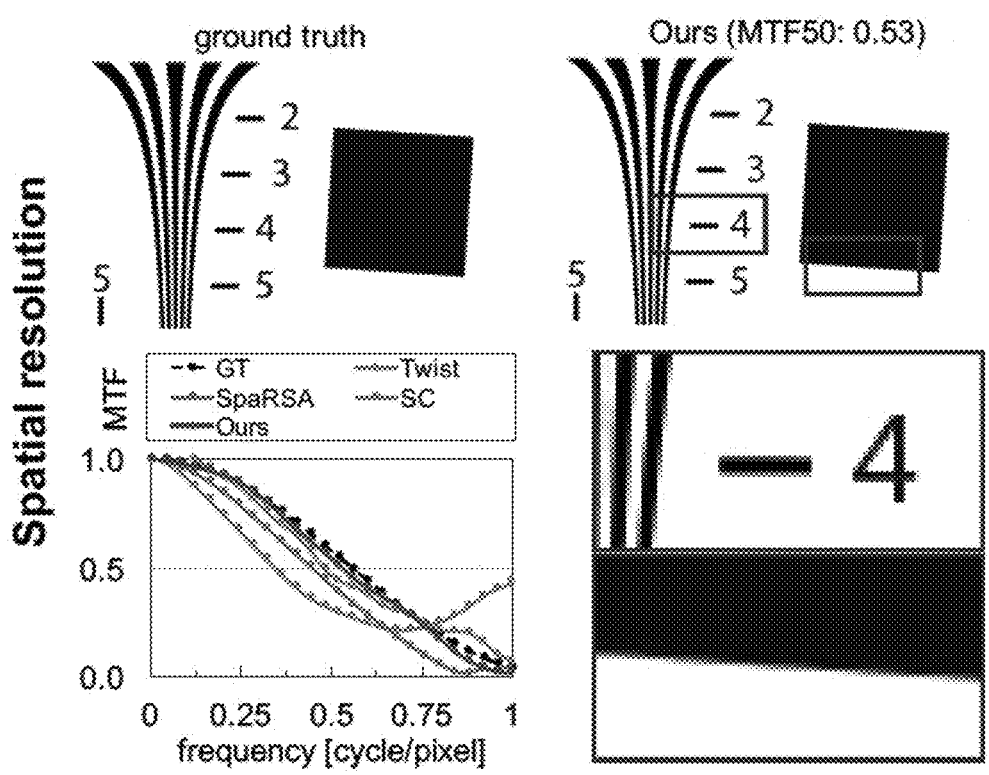

An embodiment of the inventive concept may evaluate the spatial resolution of spectral images reconstructed by the embodiment of the inventive concept by calculating spatial frequency responses as modulation transfer functions (MTFs). An embodiment of the inventive concept may reconstruct the standard spatial frequency measurement chart (ISO 12233), again using TwIST, SpaRSA, sparse coding, and the method according to the embodiment of the inventive concept. FIGS. 8A-ED show the results of reconstructing the standard spatial frequency measurement chart (ISO 12233) using TwIST, SpaRSA, sparse coding, and the method according to the embodiment of the inventive concept. Like other existing optimization methods, TwIST and SpaRSA show suboptimal reconstruction of spatial frequencies. While the data-driven approach based on sparse coding improves this spatial resolution, the method according to an embodiment of the inventive concept may clearly yield the best results.

Analysis of Parameters

Impact of the Fidelity Prior

One of the key novelties of optimization formulation according to an embodiment of the inventive concept may be $\alpha$-fidelity prior in Equation 11 above, relating the nonlinear representations from the trained autoencoder with the reconstruction problem. As shown in FIGS. 9A-9B, this prior may have a large impact on the accuracy of the reconstruction. PSNR increases significantly from 30.84 dB to 34.33 dB, while SSIM also increases from 0.93 To 0.96. Moreover, in the second row, an embodiment of the inventive concept may show how the prior influences the PSNR with the number of iterations, as well as the reflectance accuracy for the yellow and red feathers.

Impact of Hidden Layers

Figure 10A:
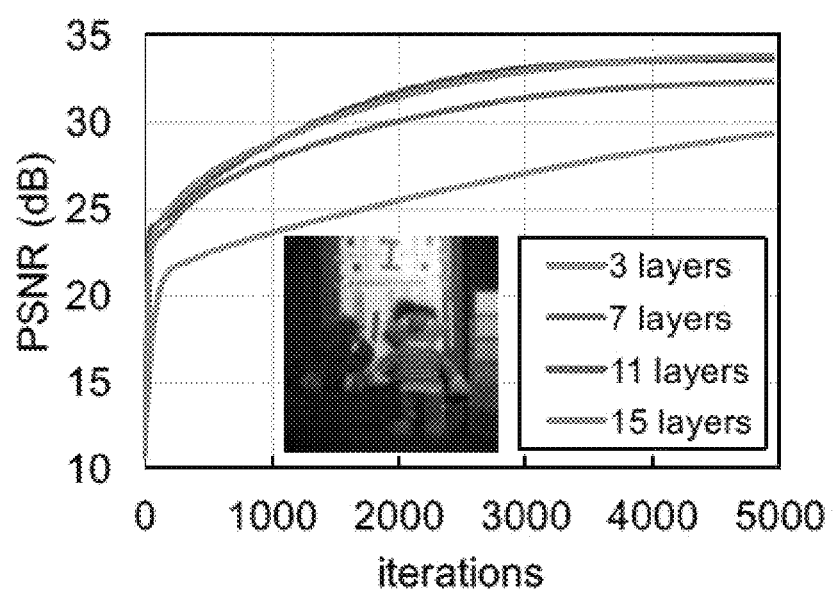
FIGS. 10A and 10B are drawings illustrating the impact of the number of hidden layers on spatial resolution of reconstruction.
Figure 10B:
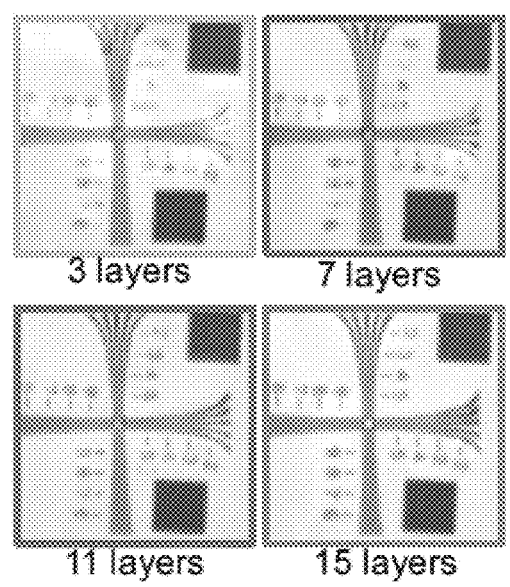

FIG. 10 shows the impact of the number of hidden layers on the spatial resolution of the reconstruction. As shown in FIG. 10A, an embodiment of the inventive concept may find that the accuracy of reconstruction is not greatly improved on 11 layers or more. As after eleven layers there is no significant increase of spatial resolution, given the tradeoff between performance and memory, an embodiment of the inventive concept may set the number of hidden layers to eleven.

Figure 13A:
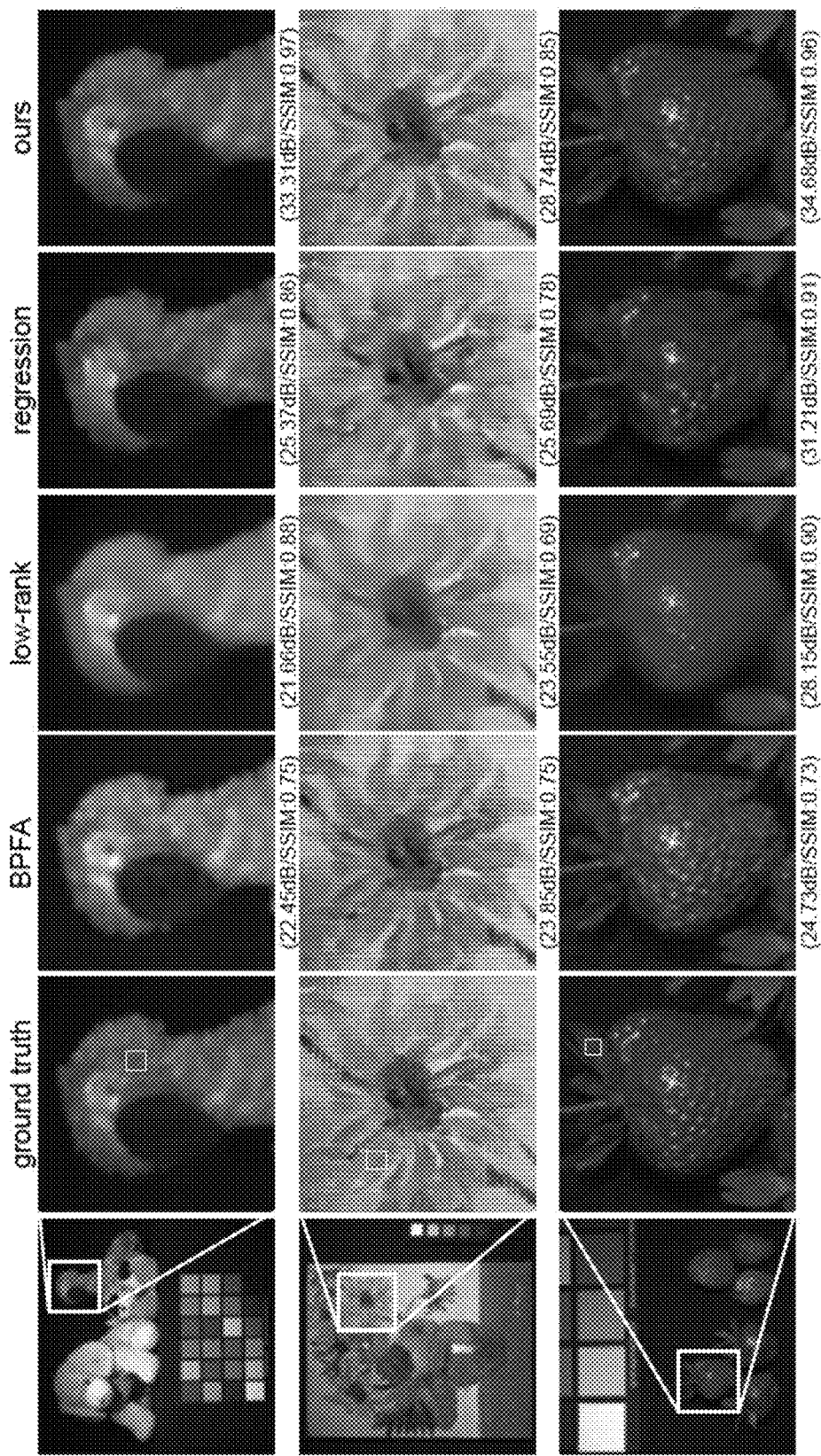
FIGS. 13A and 13B are drawings illustrating the result of comparison of an embodiment of the inventive concept, ground truth, and other methods.
Figure 13B:
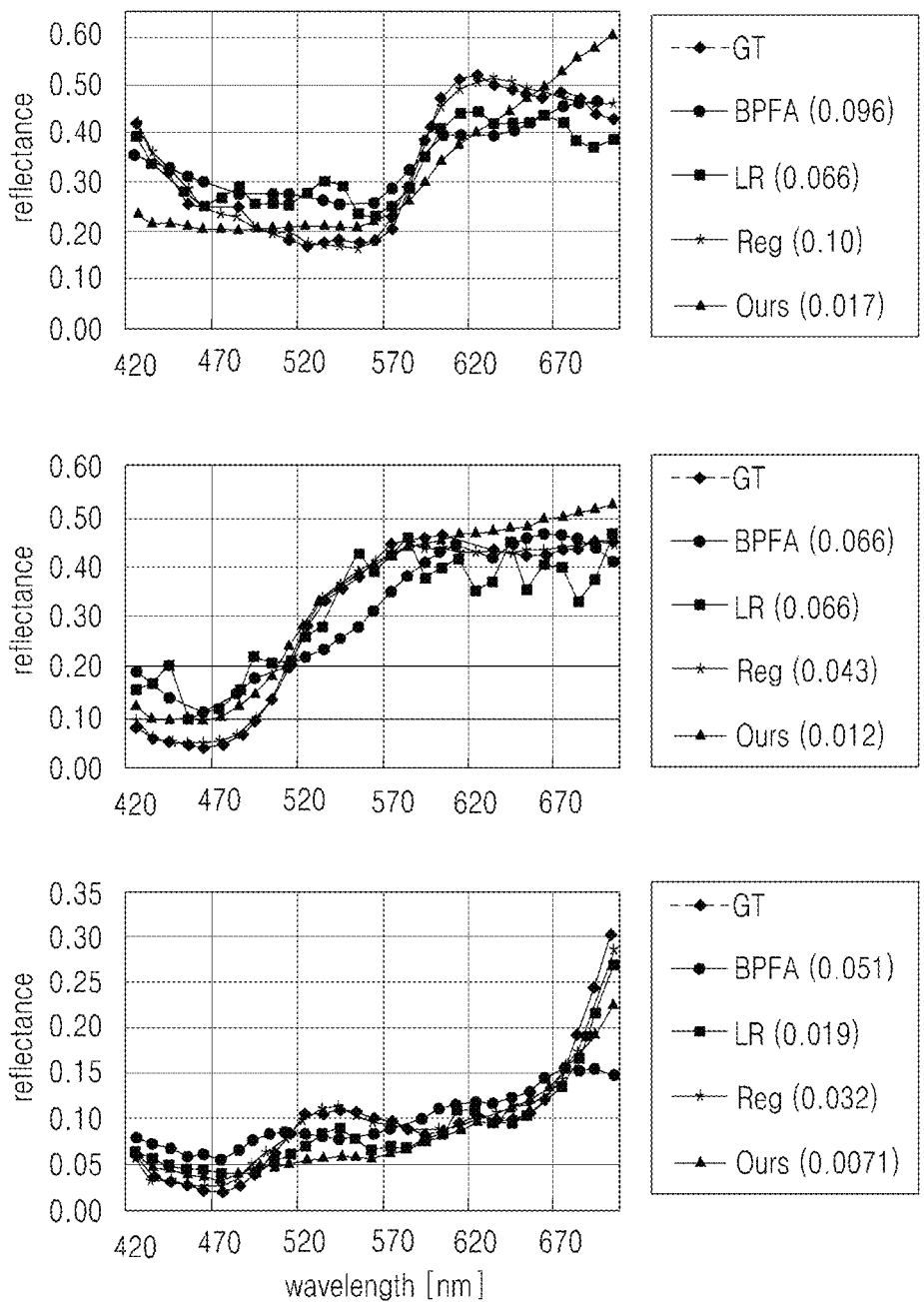

An embodiment of the inventive concept may conduct an additional experiment with the beta process factor analysis (BPFA) and the low-rank reconstruction method. Quantitative evaluations according to an embodiment of the inventive concept may be computed for reflectance, rather than radiance, to ensure color fidelity. This may typically lower PSNR values by 2.0 to 3.0 dB, compared to radiance. In BPFA, hyperspectral images may be reconstructed from coded inputs, adopting the reconstruction method used in blind compressive sensing. The latter method may refine initial estimations of hyperspectral images exploiting the spectral-spatial correlation that exists in similar, nonlocal hyperspectral image patches. As shown in FIG. 13, for the 32 hyperspectral images from the Columbia dataset, the average PSNR and SSIM measurements were 21.71 dB and 0.69 for BPFA, and 24.48 dB and 0.85 for the low-rank reconstruction, while for the method according to an embodiment of the inventive concept the embodiment of the inventive concept may obtain 32.46 dB and 0.95, respectively. Note that BPFA is designed for multi-frame CASSI, but an embodiment of the inventive concept may only use a single input for fairness of comparison. As described above, the quality of the low-rank reconstruction may depend on initial estimations, which is a TwIST reconstruction in this case. Therefore, the PSNR and SSIM values of the low-rank reconstruction may be higher or equal to those of TwIST (23.74 dB/0.85) shown in FIG. 6.

A straightforward learning-based reconstruction may train an end-to-end regression network taking compressive measurements as input, and outputting the corresponding original images. The modulation matrix Φ may be implicitly encoded in the regression model. An embodiment of the inventive concept may compare reconstruction to a regression-based network. Since it had not been originally designed for hyperspectral imaging, an embodiment of the inventive concept may modify it to train a deep convolutional regression network that directly estimates a hyperspectral image from a compressive input. The revised deep regression network may include eleven hidden convolutional layers with 64 feature maps. The convolutions may be performed with 3×3 kernels, using ReLU activation functions. For training, an embodiment of the inventive concept may use the Columbia dataset, where the size of the images is 512×512. This regression network may be restricted to 512×512 images, since the fixed modulation matrix Φ is implicitly encoded in the network. An embodiment of the inventive concept may train the network using the ADAM optimizer. Packing eight images as a batch, training may be carried out for 3000 epochs.

Figure 14:
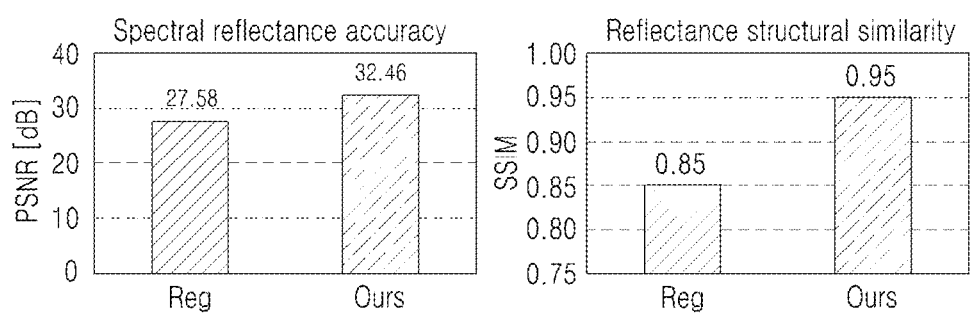
FIG. 14 is a drawing illustrating an example of comparison of spectral reflectance accuracy and spatial structure accuracy for an embodiment of the inventive concept and a regression-based approach.

For comparisons, an embodiment of the inventive concept may use 32 spectral images from the Columbia dataset. Since the regression-based reconstruction does not need an optimization step, it is very fast (average of 0.14 sec.); however, it yields significantly less accurate reconstructions both in the spectral and spatial domains. FIG. 13 shows representative results, while FIG. 14 shows PSNR and SSIM values averaged across the whole dataset. As seen from FIGS. 13 and 14, besides the lower quality of the regression-based reconstruction, learning an end-to-end regression requires training a different model each time the image setup changes (image size, mask patterns, lens, or the pixel pitch of the sensor), which is highly impractical.

New Hyperspectral Image Dataset

Figure 11:
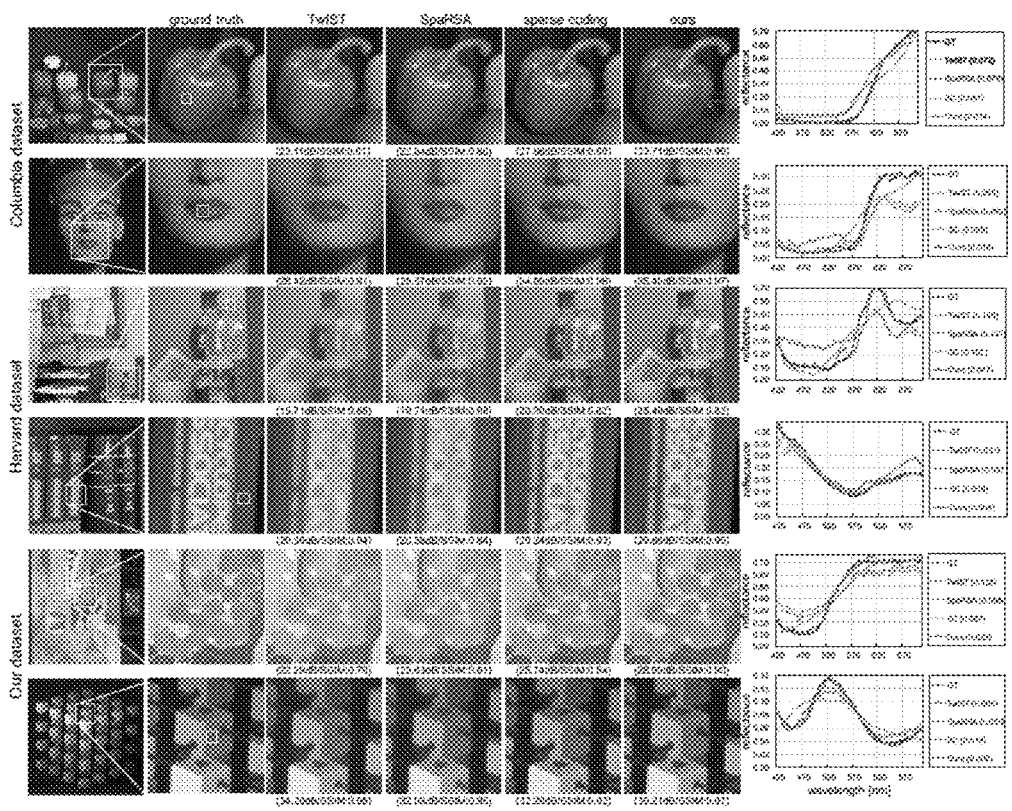
FIG. 11 is a drawing illustrating reconstruction results of an embodiment of the inventive concept and conventional methods.

An embodiment of the inventive concept finds that the Columbia dataset offers images with a wide range of spectral information, but at low spatial resolution and slightly out-of-focus. Similarly, the Harvard dataset provides high spatial resolution, but limited spectral range. To improve this, an embodiment of the inventive concept may capture a new high-resolution dataset, consisting of 30 hyperspectral images covering a wide spectral range. FIGS. 11 and 12 show some examples; the complete dataset may be downloaded from a project website according to an embodiment of the inventive concept.

Results on a Real Hyperspectral Camera

Figure 15A:
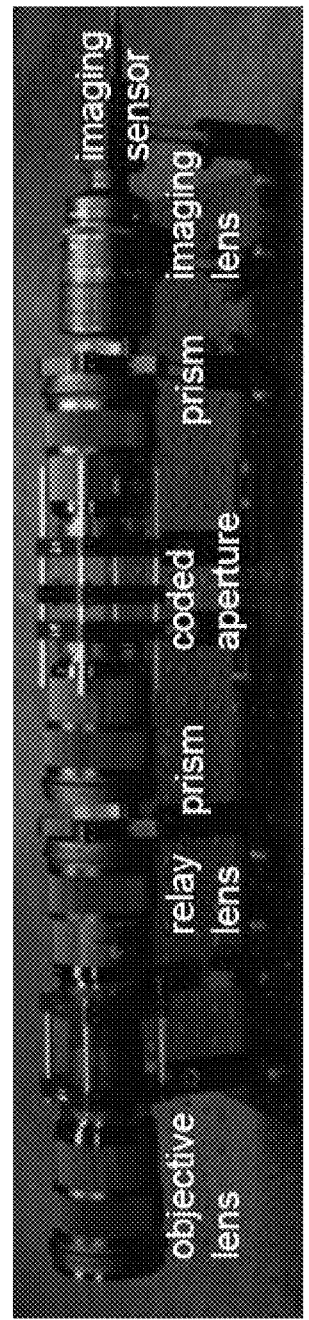
FIGS. 15A, 15B, 15C, 15D, and 15E are drawings illustrating an example of a hyperspectral imaging system according to an embodiment of the inventive concept and an example of the result for the hyperspectral imaging system.

To validate the reconstruction algorithm according to an embodiment of the inventive concept, the embodiment of the inventive concept may build a prototype of a spatial-spectral encoded DD-CASSI imaging system, shown in FIG. 15A. Herein, the system may be made up of an apochromatic objective lens, relay lenses, two prisms (made of NBK-7, 2-degree angles, producing 13-pixel dispersion), a coded aperture, and a CCD imaging sensor. All the relay lenses (Sigma A, f/1.4) may have the same focal length (50 mm) for one-to-one imaging. The camera may be a Point-Grey Grasshopper (GS3 9.1MP Mono) with pixel pitch 3.69 µm. The coded aperture mask may include random binary patterns made through lithographic chrome etching on a quartz plate, where the pixel pitch of the binary patterns is 7.40 µm. A pixel in the mask may correspond to two-by-two pixels in the CCD sensor of the imager. Scenes may be captured under a solid-state plasma light source. An embodiment of the inventive concept may calibrate the optical properties of the system, such as the binary mask pattern $T(x,y)$ and the wavelength-dependent pixel shift function $\phi(\lambda)$ in Equation 2 above.

Learning Illumination Invariance

To handle a real-world input from a prototype according to an embodiment of the inventive concept, the embodiment of the inventive concept may retrain the model with additional datasets under various illuminations of different color temperatures. An embodiment of the inventive concept may create an additional training dataset of 192 hyperspectral images, using 32 hyperspectral reflectance images from the Columbia dataset under five different color temperatures of 2000° K (CIEA, tungsten), 4000° K (fluorescent light), 5000° K (CIED50), 6500° K (CIE D65), and 13,000° K (plasma). This dataset may be further augmented for scale invariance, resulting in 384 new hyperspectral images in total. An embodiment of the inventive concept may sample 19,200 tensor patches of size 96×96×31 from this augmented dataset.

Results on Real Data

Figure 15B:
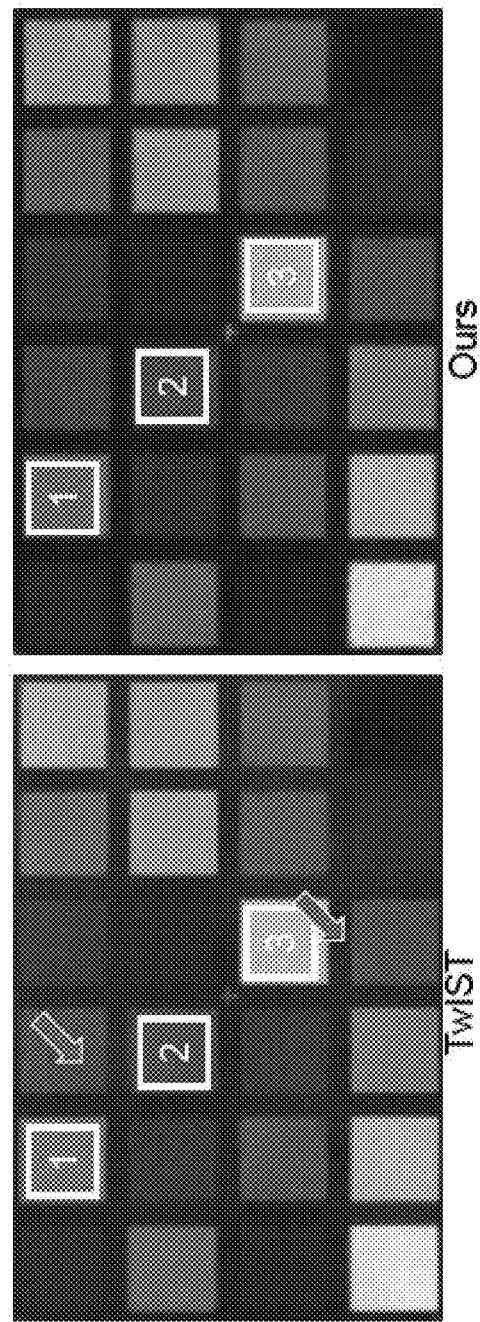
Figure 15C:
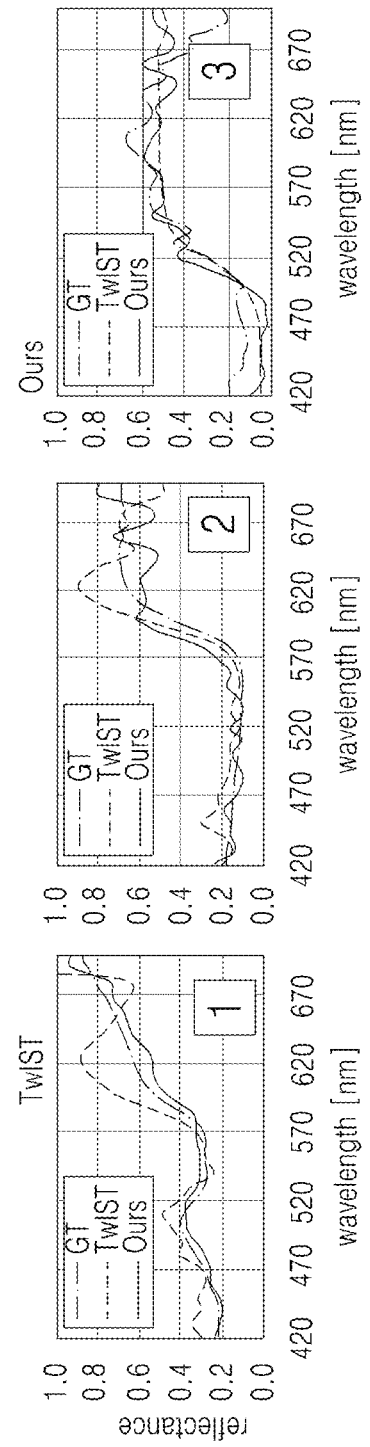
Figure 15D:
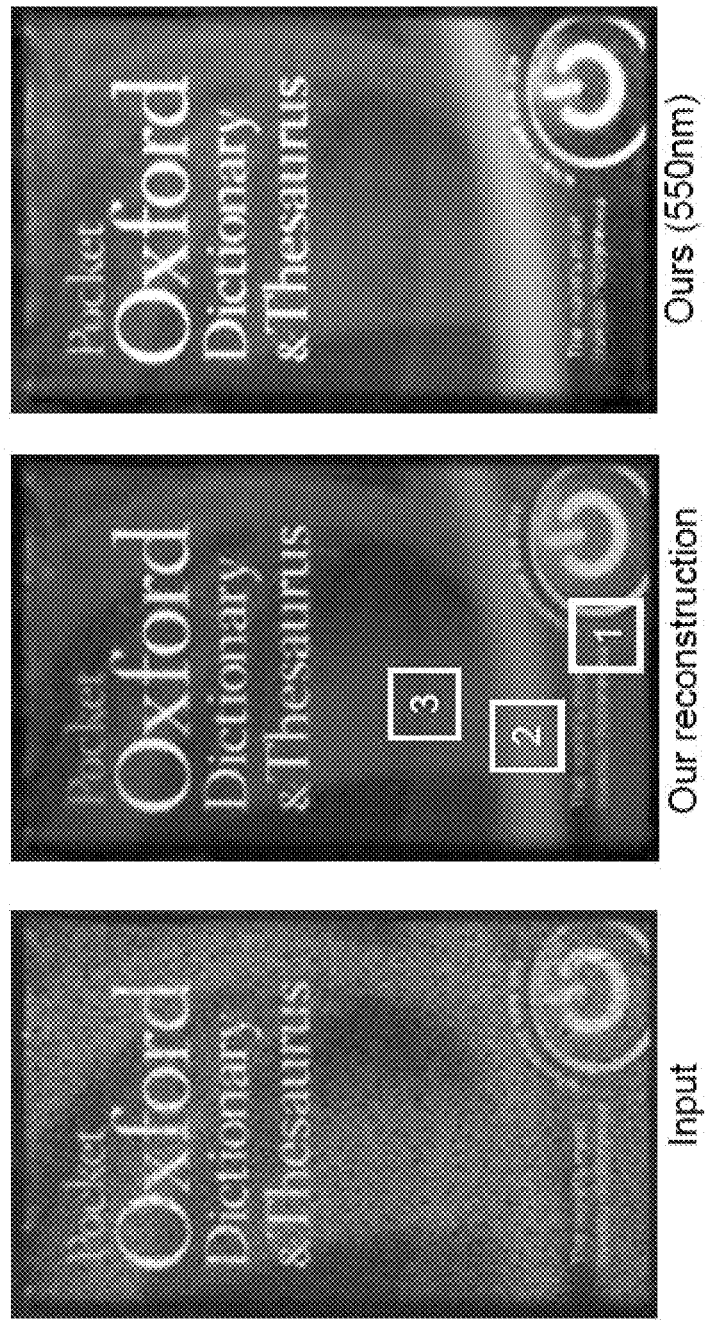
Figure 15E:
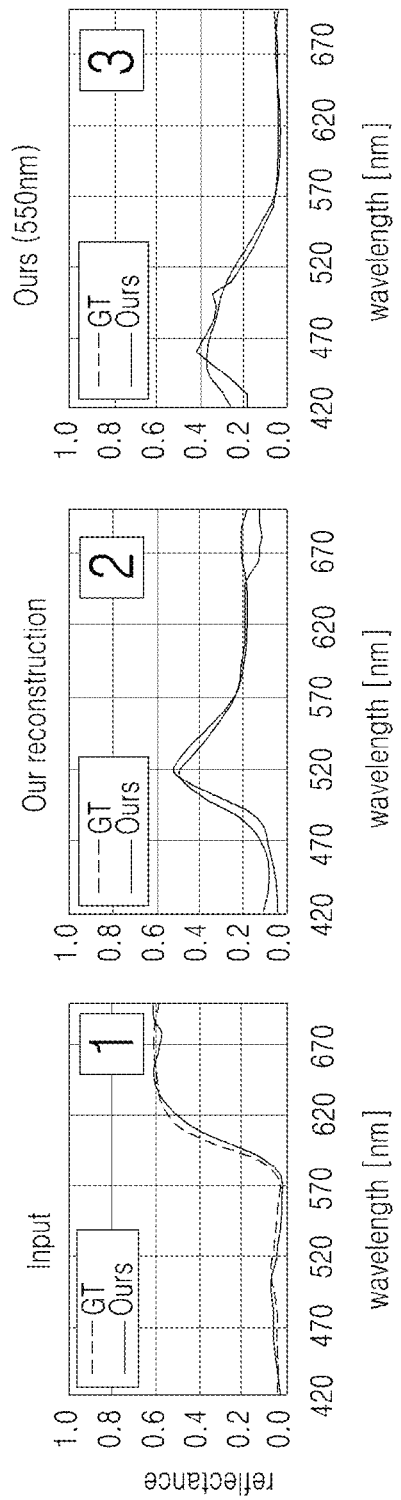

FIG. 15B compares reconstructions using TwIST4 and the method according to an embodiment of the inventive concept. Plots in FIG. 15C compare spectral accuracy on the selected patches, reconstructed by each method, with ground truth measured with a spectroradiometer. As seen from FIG. 15, the spectral reconstruction according to an embodiment of the inventive concept may outperform the conventional approach. TwIST reconstruction may suffer from spatial artifacts, and may be less accurate in the spectral domain FIGS. 15D and 15E show another result of the reconstruction according to an embodiment of the inventive concept.

Hyperspectral Interpolation

Taking advantage of the spectral prior according to an embodiment of the inventive concept, the method according to the embodiment of the inventive concept may allow to interpolate a multispectral image into a hyperspectral image of higher spectral resolution, without any hardware modification. An embodiment of the inventive concept may simply substitute the measurement matrix Φ in Equation 11 above with a wavelength subsampling matrix.

Figure 16A:
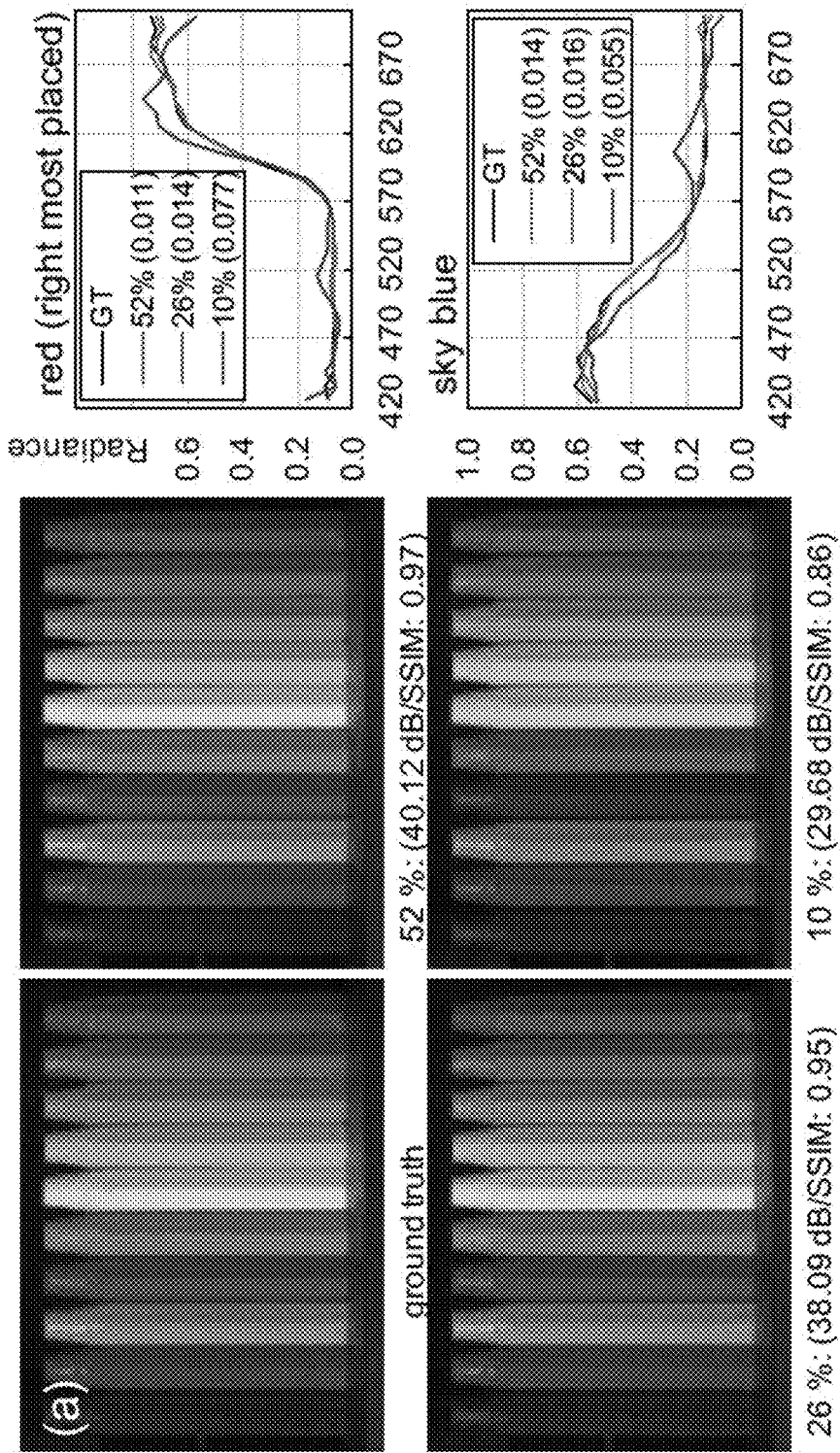
FIGS. 16A and 16B are drawings illustrating results for spectral reconstruction according to an embodiment of the inventive concept.

FIG. 16A shows interpolated results by subsampling 52%, 26% and 10% of the original spectral wavelengths, which translates into 16, 8 and 3 channels, respectively. An embodiment of the inventive concept may compare interpolated reconstructions for 31 wavelengths with a real value (or ground truth). The accuracy of the reconstructions remains high, although it predictably decays when using only 10% of the information.

Hyperspectral Demosaicing

Figure 16B:
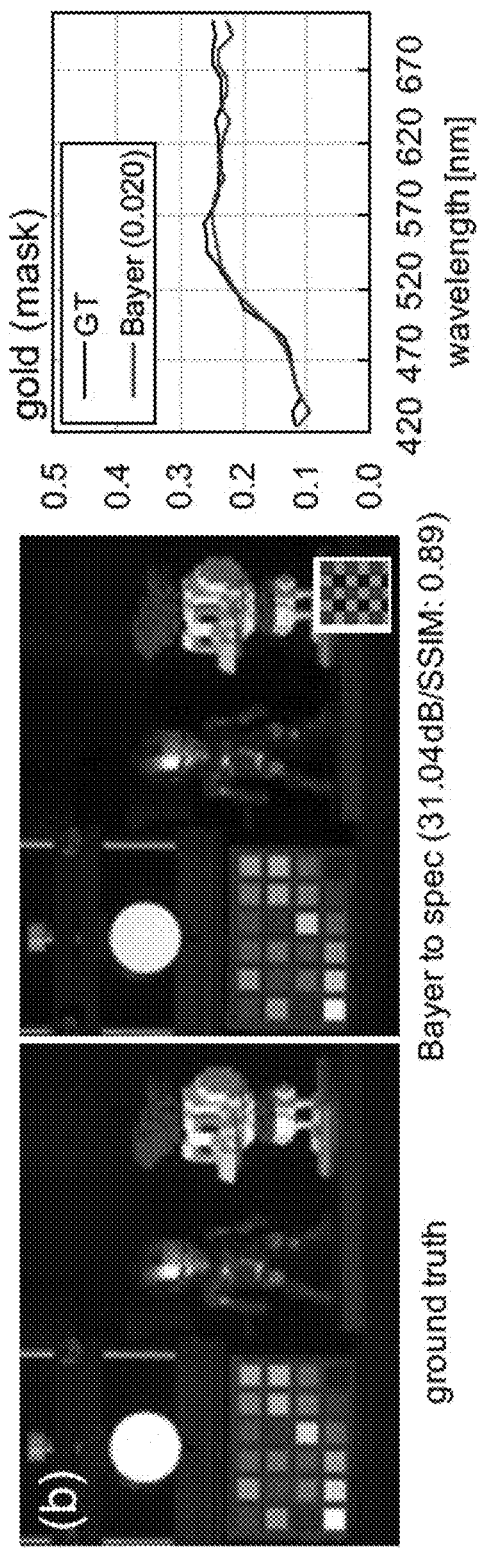

An embodiment of the inventive concept may extend interpolated reconstruction to enable hyperspectral demosaicing, assuming that an input corresponds only to wavelengths of 450 nm, 520 nm, 580 nm, and 650 nm, according to conventional Bayer-patterns. An embodiment of the inventive concept may replace the Φ matrix with the spatially and spectrally subsampling matrix in Equation 11 above. An embodiment of the inventive concept may account for diffraction blur as a Gaussian blur for the Φ matrix, and may set $\tau_2$ to a very small value (10-8) to avoid reconstruction blur. FIG. 16B shows how spectral reconstruction according to an embodiment of the inventive concept is remarkably accurate. An embodiment of the inventive concept may enable single-shot hyperspectral imaging using a Bayer-patterned multispectral input, analogous to demosaicing in a digital camera.

Limitations

The reconstruction algorithm according to an embodiment of the inventive concept may include a total variation term (which relates spectral information to neighboring pixels) to favor sparsity in the spatial domain. This may lead to suboptimal reconstruction of very fine image structures when the input is not of sufficient quality. This may be seen in FIG. 17, where the input image is slightly out of focus. Although the method according to an embodiment of the inventive concept still produces better results than other approaches, the reconstruction of the small details in the printed words may fail to be perfect.

As such, the techniques according to an embodiment of the inventive concept may outperform existing methods for both spatial resolution and spectral accuracy. In detail, an embodiment of the inventive concept may train a natural spectrum prior as nonlinear representations using a convolutional autoencoder and may formulate a novel nonlinear optimization by using the autoencoder result values as spectral priors. The reconstruction method according to an embodiment of the inventive concept may be applied to any compressive imaging architecture. Moreover, compared to the best performing method based on sparse coding, computational complexity may be reduced by two orders of magnitude.

As described above, the techniques according to an embodiment of the inventive concept may reconstruct a high-quality hyperspectral image and may be applied to any existing compressive imaging architecture by receiving coded data for the image, for example, an encoded sensor input and reconstructing a hyperspectral image of the image for the coded data based on a previously generated learning model, for example, a nonlinear learning model.

Furthermore, the techniques according to an embodiment of the inventive concept may reconstruct a hyperspectral image of the image for coded data based on an optimization technique, for example, a nonlinear optimization technique as well as a previously generated learning model. In other words, an embodiment of the inventive concept may jointly combine and use artificial intelligence, for example, a convolutional autoencoder which is a kind of convolutional neural network (CNN) and is a nonlinear learning model with the nonlinear optimization technique, thus reconstructing a high-quality hyperspectral image.

The method according to an embodiment of the inventive concept may be configured as a device or system. The configured device or system may include all the functions of the method according to an embodiment of the inventive concept.

The foregoing systems or devices may be realized by hardware components, software components, and/or combinations thereof. For example, the systems, devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented with program instructions which may be executed through various computer means and may be recorded in computer-readable media. The media may also include, alone or in combination with the program instructions, data files, data structures, and the like. The program instructions recorded in the media may be designed and configured specially for an embodiments or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of embodiments, or vice versa.

According to embodiments of the inventive concept, the apparatus may be applied to any existing compressive imaging architecture by reconstructing a high-quality hyperspectral image using artificial intelligence, for example, a convolutional autoencoder which is a kind of convolutional neural network (CNN) and is a nonlinear learning model.

According to embodiments of the inventive concept, the apparatus may outperform the state-of-the-art methods from each architecture, both in terms of spectral accuracy and spatial resolution, while its computational complexity is reduced by two orders of magnitude with respect to sparse coding techniques.

According to embodiments of the inventive concept, the apparatus may provide a new high-resolution hyperspectral dataset including sharper images of more spectral variety than existing methods, available through a project website.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for reconstructing a hyperspectral image, the method comprising:
    generating a nonlinear learning model through learning using a predetermined hyperspectral image dataset;
    receiving coded data for an image; and
    reconstructing a hyperspectral image of the image for the coded data based on the generated nonlinear learning model and a nonlinear optimization technique,
    wherein the nonlinear optimization technique jointly regularizes fidelity of nonlinear spectral representations for the generated nonlinear learning model and sparsity of gradients in a spatial domain.

2. The method of claim 1, wherein the generating of the nonlinear learning module comprises:
    generating the nonlinear learning model by training a convolutional autoencoder through the learning using the hyperspectral image dataset.

3. The method of claim 2, wherein the generating of the nonlinear learning module comprises:
    training an encoder network in a nonlinear space using the convolutional autoencoder; and
    generating the nonlinear learning model using a decoder network.

4. The method of claim 3, wherein the convolutional autoencoder comprises:
    an encoder network for transforming the hyperspectral image dataset into nonlinear representations; and
    a decoder network for generating an original dataset from the nonlinear representations.

5. The method of claim 1, wherein the nonlinear learning model is a learning model for outputting nonlinear reconstruction of the hyperspectral image.

6. The method of claim 1, wherein the
    nonlinear optimization technique is iteratively performed using an alternating direction method of multipliers (ADMM).

7. The method of claim 1, wherein the receiving comprises:
    receiving the coded data for the image using compressive hyperspectral imaging.

8. A method for reconstructing a hyperspectral image, the method comprising:
    training a spectral prior using a predetermined hyperspectral image dataset;
    receiving coded data for an image; and
    reconstructing a hyperspectral image of the image for the coded data based on the trained spectral prior and a nonlinear optimization technique,
    wherein the nonlinear optimization technique jointly regularizes fidelity of nonlinear spectral representations for the trained spectral prior and sparsity of gradients in a spatial domain.

9. The method of claim 8, wherein
    the nonlinear optimization technique is iteratively performed using an alternating direction method of multipliers (ADMM).

10. An apparatus for reconstructing a hyperspectral image, the apparatus comprising:
    a generation unit configured to generate a nonlinear learning model through learning using a predetermined hyperspectral image dataset;
    a reception unit configured to receive coded data for an image; and
    a reconstruction unit configured to reconstruct a hyperspectral image of the image for the coded data based on the generated learning model and a nonlinear optimization technique,
    wherein the nonlinear optimization technique jointly regularizes fidelity of nonlinear spectral representations for the generated nonlinear learning model and sparsity of gradients in a spatial domain.

11. The apparatus of claim 10, wherein the generation unit is configured to:
    generate the nonlinear learning model by training a convolutional autoencoder through the learning using the hyperspectral image dataset.

12. The apparatus of claim 11, wherein the generation unit is configured to:
    train an encoder network in a nonlinear space using the convolutional autoencoder; and
    generate the nonlinear learning model using a decoder network.

13. The apparatus of claim 12, wherein the convolutional autoencoder comprises:
    an encoder network for transforming the hyperspectral image dataset into nonlinear representations; and
    a decoder network for generating an original dataset from the nonlinear representations.

14. The apparatus of claim 10, wherein the nonlinear learning model is a learning model for outputting nonlinear reconstruction of the hyperspectral image.

* * * * *